US008633702B2

(12) United States Patent
Bloemenkamp et al.

(10) Patent No.: US 8,633,702 B2
(45) Date of Patent: Jan. 21, 2014

(54) APPARATUS AND METHOD FOR ACTIVELY BALANCING IMPEDANCE OF A RESISTIVITY MEASURING TOOL

(75) Inventors: Richard Bloemenkamp, Issy-les-Moulineaux (FR); Emmanuel Legendre, Sevres (FR); Alain Dumont, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 36 days.

(21) Appl. No.: 13/523,867

(22) Filed: Jun. 14, 2012

(65) Prior Publication Data
US 2012/0326723 A1 Dec. 27, 2012

Related U.S. Application Data

(63) Continuation-in-part of application No. 13/008,394, filed on Jan. 18, 2011.

(30) Foreign Application Priority Data

Jun. 16, 2011 (EP) .................................... 11305752

(51) Int. Cl.
G01V 3/20 (2006.01)
(52) U.S. Cl.
USPC ................ 324/356; 324/346; 324/357; 702/6
(58) Field of Classification Search
USPC ............................ 73/152.01–152.03, 152.19, 73/152.43–152.46; 324/323–337, 324/340–344, 220–221, 244; 702/6–11
See application file for complete search history.

(56) References Cited

U.S. PATENT DOCUMENTS

| 3,973,181 | A | 8/1976 | Calvert |
| 4,594,552 | A | 6/1986 | Grimaldi et al. |
| 6,351,129 | B1 * | 2/2002 | Gounot ......................... 324/368 |
| 6,600,321 | B2 | 7/2003 | Evans |

(Continued)

FOREIGN PATENT DOCUMENTS

| EP | 2148223 | 1/2010 |
| EP | 1947479 B1 | 6/2010 |

(Continued)

OTHER PUBLICATIONS

International Search Report and Written Opinion for the equivalent PCT patent application No. of PCT/US12/042565 issued on Jun. 25, 2013.

Primary Examiner — Arleen M Vazquez
Assistant Examiner — Robert P Alejnikov, Jr.
(74) Attorney, Agent, or Firm — Stephanie Chi; Brigitte Jeffery Echols

(57) ABSTRACT

An apparatus for making a resistivity measurement of an underground formation surrounding a borehole is provided. The apparatus includes a conductive tool body, at least one current injector electrode positioned between the tool body and a wall of the bore hole, at least one current return electrode positioned between the tool body and the wall of the bore hole, an electrical measurement device configured to monitor a voltage or a current signal indicative of an impedance imbalance, a regulator connected to the electrical measurement device, whereby the regulator is configured to receive the voltage or the current signal indicative of the impedance imbalance and is configured to generate an adjustment signal based on the voltage or the current signal indicative of the impedance imbalance.

16 Claims, 23 Drawing Sheets

(56) References Cited

U.S. PATENT DOCUMENTS

| | | |
|---|---|---|
| 6,809,521 B2 * | 10/2004 | Tabarovsky et al. .......... 324/374 |
| 7,066,282 B2 | 6/2006 | Chen et al. |
| 7,242,194 B2 | 7/2007 | Hayman et al. |
| 7,256,582 B2 | 8/2007 | Gorek et al. |
| 2003/0122547 A1 | 7/2003 | Prammer |
| 2007/0103162 A1 | 5/2007 | Morys et al. |
| 2008/0068025 A1 * | 3/2008 | Gold et al. .................... 324/367 |
| 2010/0013487 A1 | 1/2010 | Bloemenkamp |

FOREIGN PATENT DOCUMENTS

| | | |
|---|---|---|
| GB | 2401185 A | 11/2004 |
| WO | 2007/055788 | 5/2007 |
| WO | 2008/077477 A1 | 7/2008 |

* cited by examiner

APPARATUS AND METHOD FOR ACTIVELY BALANCING IMPEDANCE OF A RESISTIVITY MEASURING TOOL

This application is a continuation-in-part of application Ser. No. 13/008,394, filed Jan. 18, 2011, which is United States Publication Number 2011/0140702, entitled "Balanced Impedance to Prevent Borehole Reflections."

FIELD

This disclosure relates to apparatuses and methods for making resistivity measurement of an underground formation, in particularly for balancing impedance in borehole resistivity imaging.

BACKGROUND

In the exploration and production of hydrocarbons, it is desirable that the properties of the formation, such as resistivity surrounding a wellbore, be detected. Micro-resistivity tools measure borehole surface resistivity, and these resistivity measurements may then be used to obtain a borehole wall image.

When measuring the micro-resisitivity of a low-resisitivity formation surrounding a borehole in a non-conductive mud, the tool mandrel, the non-conductive mud and the low-resistivity formation together form a coaxial waveguide, particularly for frequencies above about 100 kHz. The impedance that may be measured between the mandrel and the formation at the position where a measurement system is located can then be unstable. This is because any contact or partial contact between the mandrel and the formation that may more than tens of meters away from the measurement system can have an effect on this impedance. These variations of impedance will normally have an effect on electromagnetic measurements, particularly those above about 100 kHz, if no precautions are taken.

EP Patent Application 06292050.9 attempts to provide one solution to this problem by preventing the waveguide being excited while at the same time preventing reflections from having an effect by separating the waveguide from the measurement system by electrically decoupling the measurement system from the tool mandrel.

SUMMARY

It is an object of this disclosure to provide apparatuses and methods to address the effect that borehole guided waves may have on a measurement system.

A first aspect of this disclosure relates to an apparatus for making resistivity measurements of an underground formation surrounding a borehole, comprising:
   a conductive tool body;
   a pad having a conductive back face and an insulating front face with conductive electrodes located there between;
   at least one current injector electrode and at least one current return electrode mounted on a face of the pad so as to be positionable in use, adjacent the wall of the borehole, the injector and return electrodes being electrically isolated from each other;
wherein the tool body, pad, and current injector and return electrodes are arranged such that in use:
a) the ratio of the electric impedance between the current injector electrode and the tool body and the electrical impedance between the current return electrode and the tool body on one hand, and
(b) the ratio of the electrical impedance between the current injector electrode and the formation and the electrical impedance between the current return electrode and the formation on the other hand, are substantially equal or sufficiently match with each other such that substantially no potential difference or only notable potential difference below an acceptable level between the tool body and the formation is created during the measurement.

The apparatus may be arranged so that the electrical impedance between the current injector electrode and the pad has a predetermined value, and/or the apparatus may also be arranged so that the electrical impedance between the current return electrode and the pad has another predetermined value.

The pad may be mounted on the tool body by mounting means that provides a conductive path between the pad and the tool body. The mounting means may comprise an arm. The pad may comprise a conductive back face that is made of a metallic material and electrically connected to the tool body.

In some embodiments, the pad may comprise two current return electrodes, with the current injector electrode located therebetween.

The current return electrode(s) may be configured to wrap around part of the current injector electrode so as to increase the capacitance between the tool body and the current return electrode(s), and decrease the capacitance between the tool body and the current injector electrode.

The current return electrode(s) may be configured such that a significant part (e.g., more than about 30 cm$^2$) of the electrode(s) is located between a part of the current injector electrode and the back face of the pad so as to increase the capacitance between the tool body and the current return electrode(s), and decrease the capacitance between the tool body and the current injector electrode.

The apparatus can further comprise electrical components connected to the tool body, pad and current injector and return electrodes that modify the electrical behaviour so as to provide the required impedance ratios.

The electrical components may be tuneable such that the electrical response of one or more parts of the apparatus can be adjusted to meet operational requirements. Preferably the tuneable components may be dynamically adjusted by an active system.

The current injector electrode and/or the current return electrode(s) may comprise a spatially distributed array of measurement electrodes. These measurement electrodes may be used for creating measurements which are processed to create a borehole image.

A second aspect of this disclosure relates to a method that utilizes the apparatus.

BRIEF DESCRIPTION OF DRAWINGS

Like reference symbols in the various drawings indicate like elements.

DETAILED DESCRIPTION

During resistivity measurement of a low-resistivity formation surrounding a borehole in a non-conductive fluid, a waveguide (coaxial transmission line) can be formed by the tool mandrel, the non-conductive borehole fluid and the low-resistivity formation. When measurement systems are operating above about 100 kHz, the measurement systems will inject a wave in the borehole annulus which can lead to a reflected wave. This reflected wave may perturb the measurements that the measurements systems are making. For frequencies that are not too high, the waveguide may allow for propagation of transverse electromagnetic (TEM) waves and not allow for other modes of propagation.

The impedance between the mandrel and the formation at the position where the measurements are to be taken depends on the characteristic impedance, the length and the termination load of the transmission line.

All three quantities (characteristic impedance, line length and termination load) can change over a large range and therefore impedance may vary significantly as the tool moves. In addition, these quantities may not be easy to determine, especially the impedance between the tool mandrel and the formation at the touch point. The measurement systems and techniques described herein can prevent the excitation of borehole waves by balancing the measurement systems so that substantially no potential difference or only notable potential difference below an acceptable level is created between the tool mandrel and the formation at the position where the measurement systems are deployed.

Figure 1:
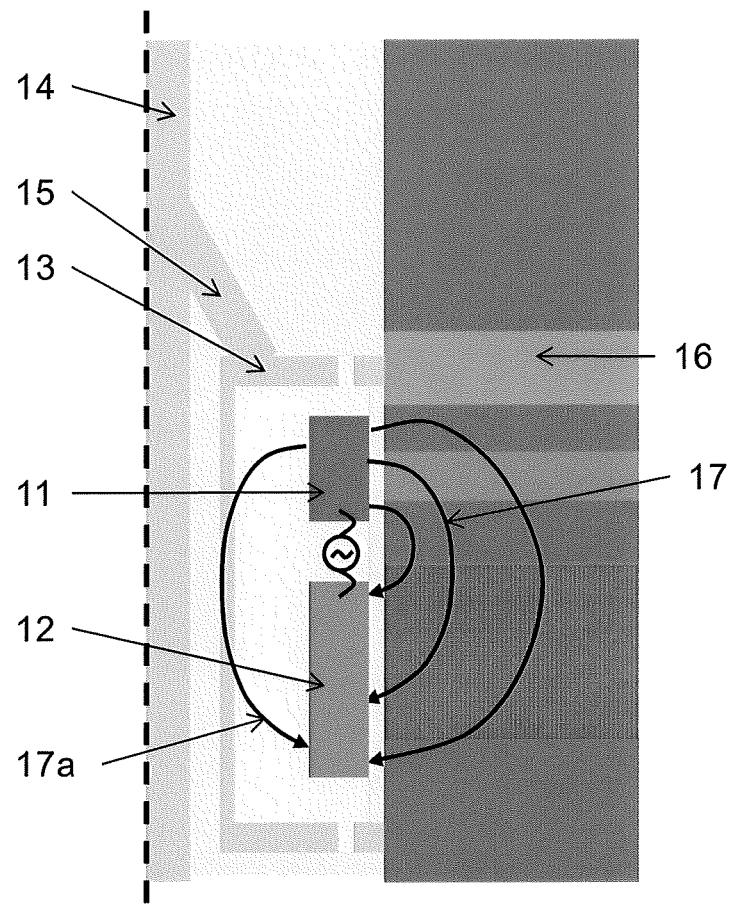
FIG. 1 shows a schematic diagram of an example of a measurement system according to the present disclosure.

With reference to FIG. 1, an exemplary measurement system includes a current injector electrode 11, a current return electrode 12 and a set of measurement electrodes (not shown) located on a pad 13, attached to a conductive tool body 14 which is centred in the borehole (usually over several hundreds of meters up to several kilometers deep), e.g., a tool mandrel or a drill pipe. The current injector and return electrodes 11, 12 and tool body 14 are electrically mutually insulated from one another. An arm 15 connects the pad 13 of the measurement system to the tool mandrel 14 to position the measurement system against the formation 16 where the measurements are to be taken. The arm 15 provides a conductive path between the pad 13 and the tool body 14.

The measurement system can be part of a tool that is measuring in an existing borehole, e.g., wireline or statically installed, or is measuring in a borehole being created, i.e., an LWD (logging while drilling)/MWD (measurement while drilling) tool. Some examples of an LWD/MWD tool are described in U.S. Pat. No. 7,242,194 and U.S. Pat. No. 7,256,582.

The measurement system can be placed entirely or partly on a pad, a mandrel, a stabilizer blade, a rotary sleeve, a centralizer, a drill pipe or other mechanical systems which can position the measurement system in a borehole. Examples of such tools that the measurement system may be part of include (guarded) 2, 3, and 4 terminal measurement tools.

When the measurement system is pushed against the borehole wall, the current injector electrode 11 can inject a measurement current 17 into the formation 16. The current 17 can then return to the current return electrode 12 on the pad 13. In addition to the measurement current 17, there may also be a leakage current 17a going from the current injector electrode 11 to the current return electrode 12 via the metallic back of the pad 13. The metallic body is the part of the pad that has a good electric contact to the arm 15 and the tool mandrel 14 at the frequency or frequencies that the measurement system is working at.

As the insulation between each of the elements of the measurement system may not be perfect, the impedance between the current injector electrode 11 and the conductive tool body 14 and the impedance between the current return electrode 12 and the tool body 14 can be tuned so that substantially no potential difference or only notable potential difference below an acceptable level is created between the tool body 14 and the formation 16. With substantially no potential difference or notable potential difference that is below an acceptable level between the tool body 14 and the formation 14, substantially no or less borehole waves may be generated. The tuning can be fixed or dynamically changing by a regulation system. The regulation system may allow the electrical behaviour of the various impedances between the tool body 14, pad 13 and current injector and return electrodes 11, 12 to be altered as different borehole conditions are encountered, so as to maintain the potential difference between the tool body 14 and the formation 16 at substantially zero or at an acceptable level.

The measurement system is designed so that the system does not induce an unacceptable level of potential difference between the mandrel 14 and the formation 16 at the position of the measurement system, and as such does not excite electromagnetic waves in the borehole. The measurement system should not be affected by variations in the characteristic impedance, the length, and the termination load of the transmission line if the measurement system is designed such that substantially no potential difference or only notable potential difference below an acceptable level is created between the tool mandrel 14 and the formation 16 at the position of the system. This can be done by arranging the tool body 14, pad 13, and current injector and current return electrodes of the measurement system so that in use (a) the ratio of the electrical impedance between the current injector electrode 11 and the tool body 14 (ZLI) and the electrical impedance between the current return electrode 12 and the tool body 14 (ZLR) is substantially equal to or sufficiently matches with (b) the ratio of the electrical impedance between the current injector electrode 11 and the formation 14 (ZMI) and the electrical impedance between the current return electrode 12 and the formation 16 (ZMR). For example, in use the two impedance ratios (ZLI/ZLR, ZMI/ZMR) do not differ by more than a predetermined percentage of the larger of the two ratios. In some cases, the two impedance ratios differ by about 25% or less. In some cases, the two impedance ratios differ by about 10% or less. In some cases, the two impedance ratios differ by about 5% or less. In some cases, the two impedance ratios differ by about 1% or less. This leads to a measurement system that generates substantially no potential difference or only notable potential difference below an acceptable level between the tool body and the formation. For example, any potential difference generated between the tool body and the formation is less than a predetermined fraction of the potential difference between the current injector electrode and the current return electrode. In some cases, the potential difference between the tool body and the formation is about 25% or less than the potential difference between the current injector and return electrodes. In some cases, the potential difference between the tool body and the formation is about 10% or less than the potential difference between the current injector and return electrodes. In some cases, the potential difference between the tool body and the formation is about 5% or less than the potential difference between the current injector and return electrodes. In some cases, the potential difference between the tool body and the formation is about 1% or less than the potential difference between the current injector and return electrodes. In those situations, the measurement system does not inject any significant or unacceptable levels of electromagnetic waves into the waveguide independent of the characteristics of the waveguide.

This disclosure is applicable to systems where:
the electrical/electromagnetic measurement systems have frequencies above about 100 kHz or temporal signals with spectral components above about 100 kHz;
in a borehole filled with mud that at the measurement frequency is significantly more resistive than the formation; and
where the measurement system excites unwanted EM waves in the borehole and is affected by the reflecting borehole waves.

Figure 2:
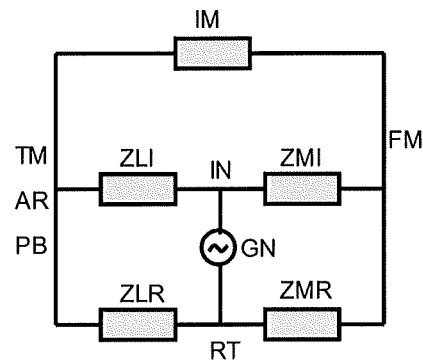
FIG. 2 shows a diagram of an electrical equivalent of FIG. 1.

FIG. 2 shows an equivalent circuit scheme for the measurement system shown in FIG. 1. To balance the measurement system, an impedance is chosen such that the impedances ZLI and ZLR are such that there is no or a very small voltage across ZIM, which is the electric complex impedance measured between the tool mandrel 14, TM, and the formation 16, FM, at the point of measurement, i.e., no or little potential difference between the back face of the pad, PB, and the formation 16, FM. The measurement system balances the impedances by making ZLI and ZLR as big as possible while still respecting the equation:

$$ZLI/ZLR \approx ZMI/ZMR$$

where ZLI is the complex impedance between the current injector electrode, IN, and the pad back face, PB;
ZLR is the complex impedance between the current return electrode, RT, and the pad back face, PB;
ZMI is the complex impedance between the current injector electrode, IN, and the formation, FM; and
ZMR is the complex impedance between the current return electrode, RT, and the formation, FM.

If this equation is sufficiently respected then the voltage across ZIM can be close to zero or maintained at an acceptable level. Maximising ZLI and ZLR decreases the coupling to the coaxial transmission line in the case where the equation is not adequately respected.

ZMI is the complex impedance of the leaky mud capacitance between IN and FM. This impedance therefore varies with the standoff between IN and FM. The capacitance between IN and FM can to first order be approximated by a parallel plate capacitance. The surface area of the part of the current injector electrode IN that is facing the borehole wall is the size of the plate. The standoff is the distance between the plates, and the mud permittivity is the dielectric permittivity of the material between the plates. For a better approximation, it is desirable to include fringing capacitance between other parts of the current injector electrode IN and the formation FM. Models or computer simulations can be used to obtain this capacitance for various designs, mud and formations. As an example, the injector surface area may be about 1600 mm$^2$, the standoff may be about 3 mm and the mud dielectric permittivity may be about 5 $\in_0$, leading to an injector-formation-capacitance of about 24 pF.

ZMR is the complex impedance of the leaky mud capacitance between RT and FM, therefore this impedance may vary with the standoff between RT and FM. The capacitance between RT and FM can to first order be approximated by a parallel plate capacitance. The surface area of the part of the current return electrode(s) RT that is facing the borehole wall is the size of the plate. The standoff is the distance between the plates, and the mud permittivity is the dielectric permittivity of the material between the plates. As an example, the return surface area may be about 8000 mm$^2$, the standoff may be about 3 mm and the mud dielectric permittivity may be about 5 $\in_0$, leading to a return-formation-capacitance of about 120 pF.

The impedances ZLI and ZLR can be determined during the design of the tool, but due to spatial restrictions at least one of the two impedances can have a large capacitive component of the order of about several tens or hundreds of pico-Farads. By altering the design of the tool or by adding one or more electric components, it is possible to balance the two capacitances.

If the standoff IN to FM and RT to FM vary in the same way, then the ratio ZMI/ZMR may not change and one can use a fixed ratio ZLI/ZLR. However, if with standoff they do not vary in the same way, one may rely on ZLI or ZLR being sufficiently high to prevent the waveguide effect or one may apply some actively regulated balancing technique(s) to obtain the correct ratio. Likewise, if the mud permittivity changes, ZMI/ZMR may not change and one may use a fixed ratio of ZLI/ZLR.

Figure 3:
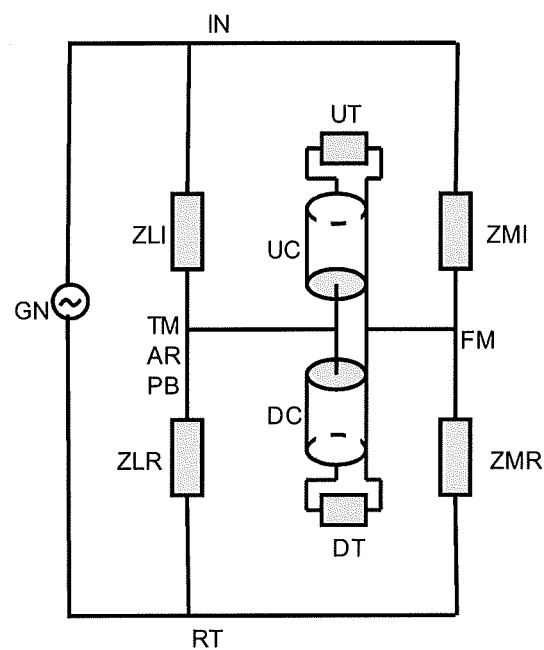
FIG. 3 shows a diagram for another electrical equivalent of FIG. 1.

FIG. 3 shows an alternative view of the equivalent circuit scheme of FIG. 1. FIG. 3 shows that by properly choosing the ratio ZLI/ZLR, it is possible to make the potential difference between TM and FM substantially equal to zero or at an acceptable level. FIG. 3 is equivalent to FIG. 2 where the ZIM has been replaced by the two borehole coaxial transmission lines, where UC is the upward coaxial line formed by TM, borehole annulus and FM; DC is the downward coaxial line formed by TM, borehole annulus and FM; UT is the upward coaxial line termination, e.g., due to TM touching FM or because it is open-ended; and DT is the downward coaxial line termination, e.g., due to TM touching FM or because it is open-ended. In some cases, the downward coaxial line may be negligible, e.g., in some configurations where the tool is the last tool in a tool string.

Figure 4:
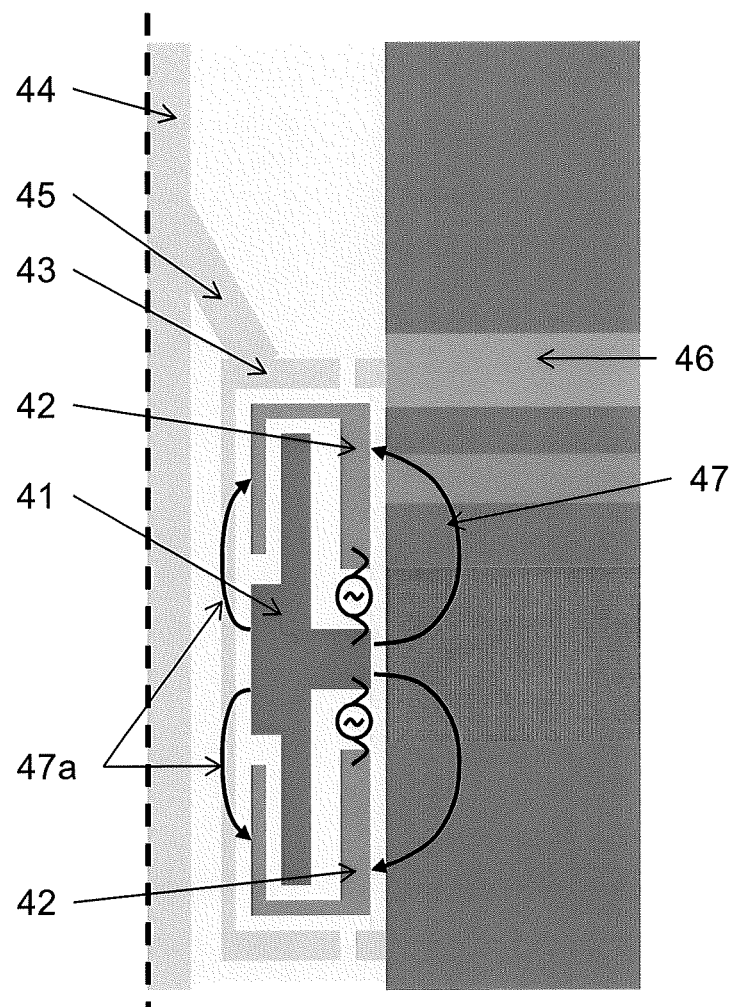
FIG. 4 shows a schematic diagram of another example of a measurement system according to the present disclosure.

FIG. 4 shows another example of a measurement system according to the present disclosure. The measurement system includes a pad 43 with one current injector electrode 41 and two current return electrodes 42 attached to a tool mandrel 44 via an arm 45. The current return electrodes 42 may have an extension folded around the current injector electrode 41. This increases the capacitance between the back plate of the pad 43 and the current return electrode 42 while at the same time decreasing the capacitance between the pad back plate and the current injector electrode 41. Therefore ZLI will increase and ZLR will decrease. The impedance ZLI can be measured with an impedance meter with the terminals connected to the pad back plate and the current injector electrode; while the impedance ZLR can be measured with an impedance meter with the terminals connected to the pad back plate and one of the two current return electrodes. By properly choosing the size of the extension folded around the current injector electrode, the ratio ZLI/ZLR can be fixed to a predetermined value.

When the measurement system is pushed against the borehole wall, the current injector electrode 41 can inject a measurement current 47 into the formation 46. The current 47 can then return to the current return electrode 42 on the pad 43. In addition to the measurement current 47, there may also be a leakage current 47a going from the current injector electrode 41 to the current return electrode 42 via the metallic body of the pad 43.

Figure 5:
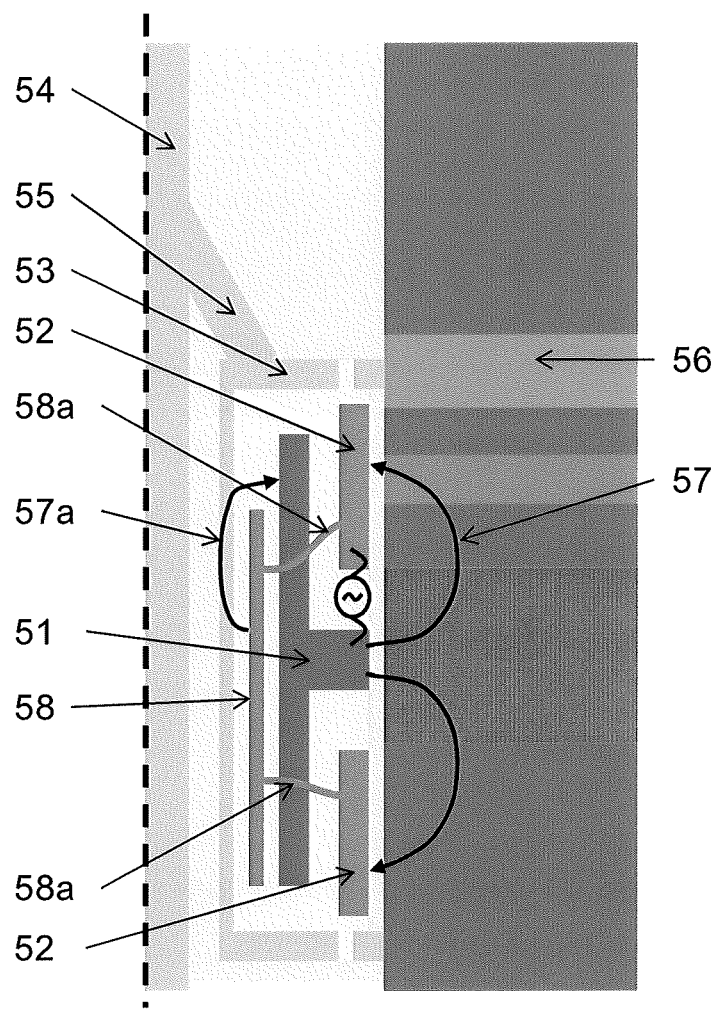
FIG. 5 shows a schematic diagram of a further example of a measurement system according to the present disclosure.

FIG. 5 shows a further example of a measurement system according to the present disclosure. The measurement system includes a pad 53 with one current injector electrode 51 and two current return electrodes 52 attached to a tool mandrel 54 via an arm 55. The current return electrodes 52 are connected via standard electrical connections elements 58a such as pins, wires, and the like to a conductive sheet 58 that is positioned between the current injector electrode and the conductive back plate of the pad 53. This increases the capacitance between the back plate of the pad 53 and the current return electrodes 52, while at the same time decreasing the capacitance between the pad back plate and the current injector electrode 51. The impedance ZLI can be measured with an impedance meter with the terminals connected to the pad back plate and the current injector electrode; while the impedance ZLR can be measured with an impedance meter with the terminals connected to the pad back plate and one of the two current return electrodes. By properly choosing the size of the conductive sheet 58, the ratio ZLI/ZLR can be fixed to a predetermined value.

When the measurement system is pushed against the borehole wall, the current injector electrode 51 can inject a measurement current 57 into the formation 56. The current 57 can then return to the current return electrode 52 on the pad 53. In addition to the measurement current 57, there may also be a leakage current 57a going from the current injector electrode 51 to the current return electrode 52 via the metallic back of the pad 53.

Other systems to obtain balancing of impedance can include the use of active, tuneable discrete electrical components such as tuneable capacitors, inductors and/or resistors or complete active systems. These electrical components can be connected to the tool body, pad and/or the current injector and return electrode(s) to modify their electrical behaviour so as to provide the desired impedance ratios.

Figure 6:
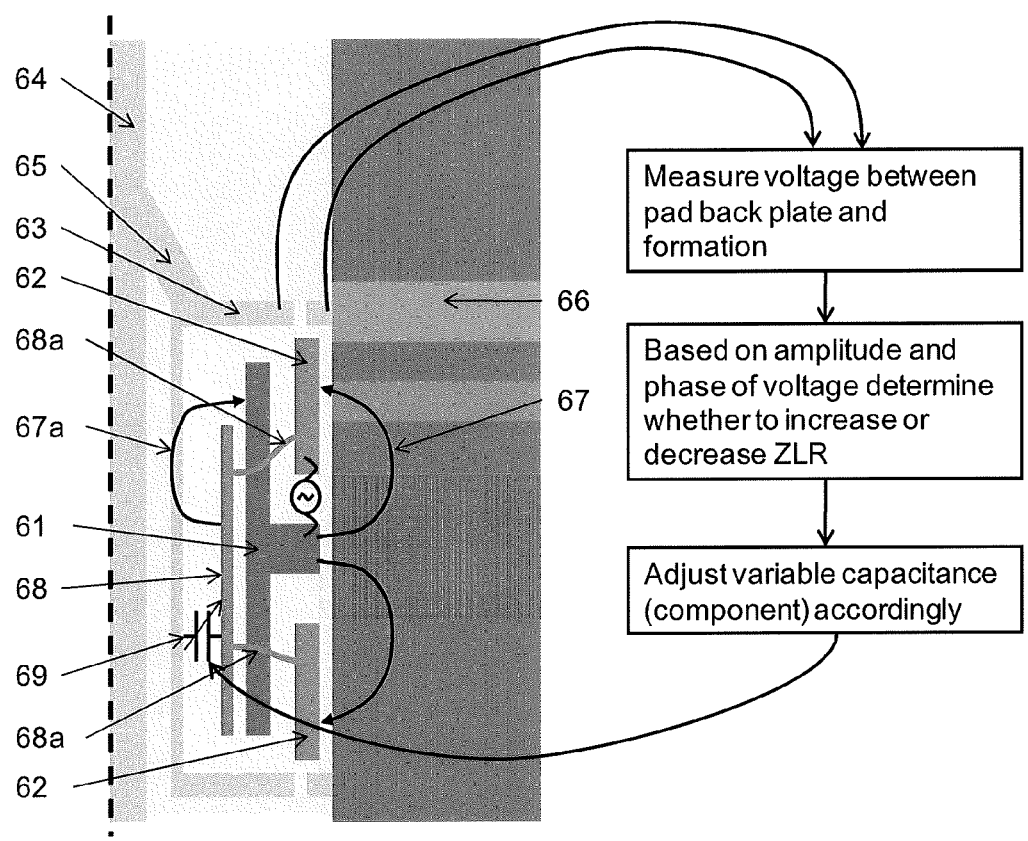
FIG. 6 shows a schematic diagram of an example of a measurement system that uses active balancing according to the present disclosure.

FIG. 6 shows yet another example of a measurement system according to the present disclosure. In this example, the measurement system includes a pad 63 attached to a tool mandrel 64 via an arm 65. The pad 63 includes one current injector electrode 61 and two return electrodes 62, and a measurement current 67 may be injected into the formation 66 by the current injector electrode 61 and returned to the two return electrodes 62. The measurement system further uses a tuneable variable capacitor component 69. The potential difference between the formation 66 and the back plate of a pad 63 is measured. This potential difference can for example be measured with a voltmeter with one terminal connected to the pad back plate and the other terminal connected to a conductor which is in contact with the formation 66. A conductive wear plate 68 that is in contact with the formation can be an example for such a conductor. The amplitude of the potential difference is a measure of unbalance of the system. One can adjust the capacitance of the variable capacitor 69 so that this amplitude decreases to an acceptable level for which the tool can be considered balanced. For example, the phase or polarity can determine whether the ratio ZLI/ZLR may be too high or too low. Based on amplitude and phase (polarity), the variable capacitance can be adjusted to change the impedance ratio until the amplitude is sufficiently low; for example such that the amplitude is less than about 10% of the voltage between the current injector electrode 61 and the current return electrodes 62.

Figure 6B:
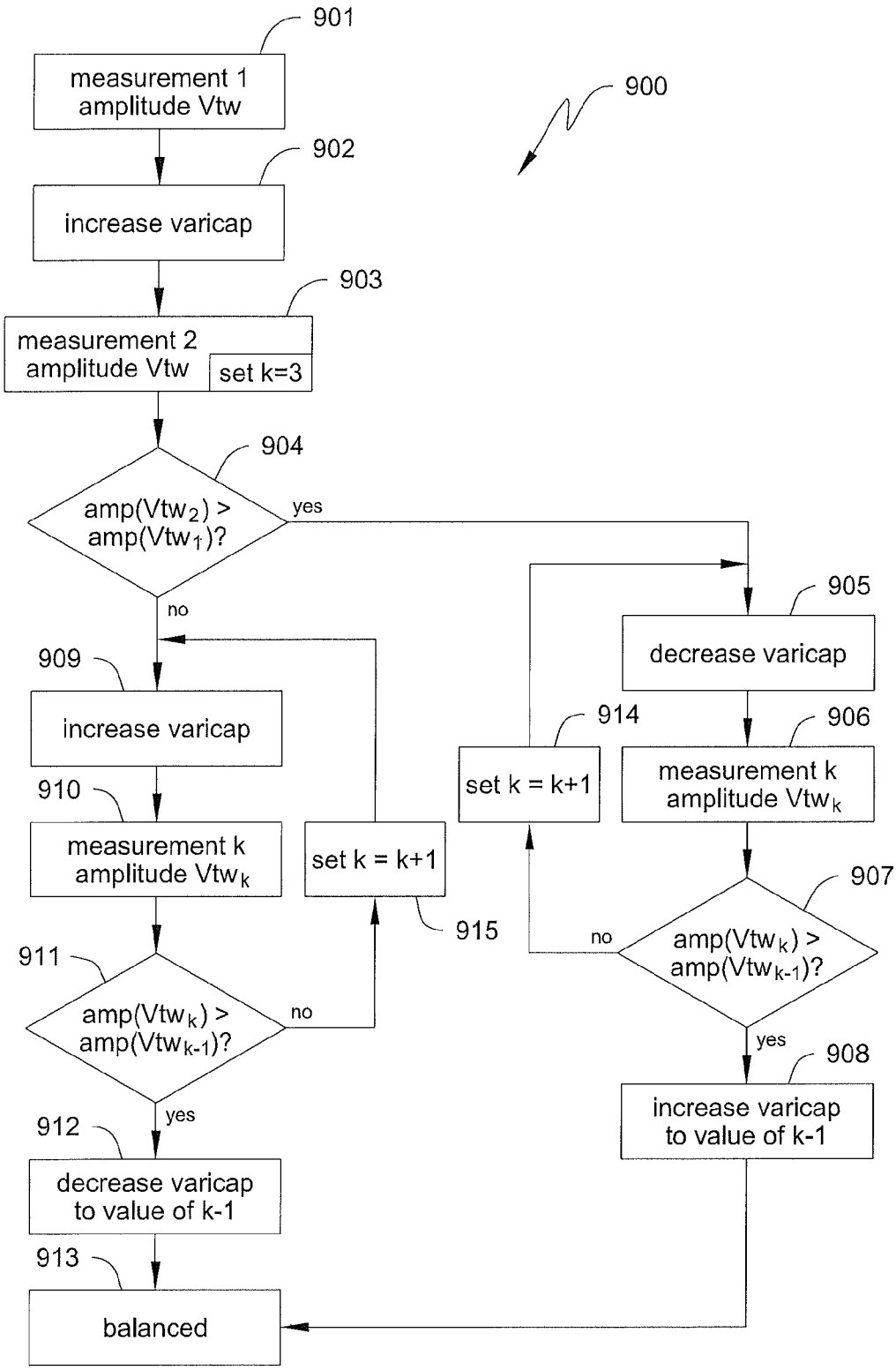
FIG. 6B shows a flow chart for actively balancing the measurement system shown in FIG. 6.

FIG. 6B shows a flow chart of one example of a process 900 for actively balancing the measurement system shown in FIG. 6. The process 900 begins at step 901, where a first measurement (i.e. $Vtw_1$) is taken of the amplitude of a potential difference between a portion of the tool body 64 (such as the back plate of a pad of the tool body 64) and a conductor that is in contact with the formation 66 (such as a conductive wear plate, not shown, that is in contact with the formation 66). The measured amplitude of the potential difference provides a measure of the imbalance in the measurement system. The process then proceeds to step 902.

At step 902, the capacitance of the variable capacitor 69 is increased and the process 900 proceeds to step 903. At step 903, a second measurement (i.e. $Vtw_2$) is taken of the amplitude of a potential difference between a portion of the tool body 64 and a conductor that is in contact with the formation 66. An integer k is also set to 3. The process 900 then proceeds to step 904.

At step 904, the process 900 determines whether the measurement $Vtw_2$ is greater than the measurement $Vtw_1$. If the measurement $Vtw_2$ is greater than the measurement $Vtw_1$, the process 900 proceeds to step 905. If the measurement $Vtw_2$ is not greater than the measurement $Vtw_1$, the process 900 proceeds to step 909.

At step 905, the capacitance of the variable capacitor 69 is reduced and the process 900 proceeds to step 906. At step 906, a $k_{th}$ measurement (i.e. $Vtw_k$) is taken of the amplitude of a potential difference between a portion of the tool body 64 and a conductor that is in contact with the formation 66. The process then proceeds to step 907.

At step 907, the process 900 determines whether the measurement $Vtw_k$ is greater than the measurement $Vtw_{k-1}$. If the measurement $Vtw_k$ is greater than the measurement $Vtw_{k-1}$, the process 900 proceeds to step 908. If the measurement $Vtw_k$ is not greater than the measurement $Vtw_{k-1}$ the process 900 proceeds to step 914.

At step 908, the capacitance of the variable capacitor 69 is increased to a value that would result in a measurement of $Vtw_{k-1}$. The process 900 then proceeds to step 913. At step 913, the system is considered balanced and an accurate resistivity measurement of the formation 66 can be made.

At step 914, the integer k is set to k+1 and the process proceeds back to step 905.

At step 909, the capacitance of the variable capacitor 69 is increased and the process proceeds to step 910. At step 910, a $k_{th}$ measurement (i.e. $Vtw_k$) is taken of the amplitude of a potential difference between a portion of the tool body 64 and a conductor that is in contact with the formation 66. The process then proceeds to step 911.

At step 911, the process 900 determines whether the measurement $Vtw_k$ is greater than the measurement $Vtw_{k-1}$. If the measurement $Vtw_k$ is greater than the measurement $Vtw_{k-1}$, the process 900 proceeds to step 912. If the measurement $Vtw_k$ is not greater than the measurement $Vtw_{k-1}$ the process 900 proceeds to step 915.

At step 915, the capacitance of the variable capacitor 69 is decreased to a value that would result in a measurement of $Vtw_{k-1}$. The process 900 then proceeds to step 913. At step 913, the system is considered balanced and an accurate resistivity measurement of the formation 66 can be made.

At step 915, the integer k is set to k+1 and the process proceeds back to step 905.

Figure 7:
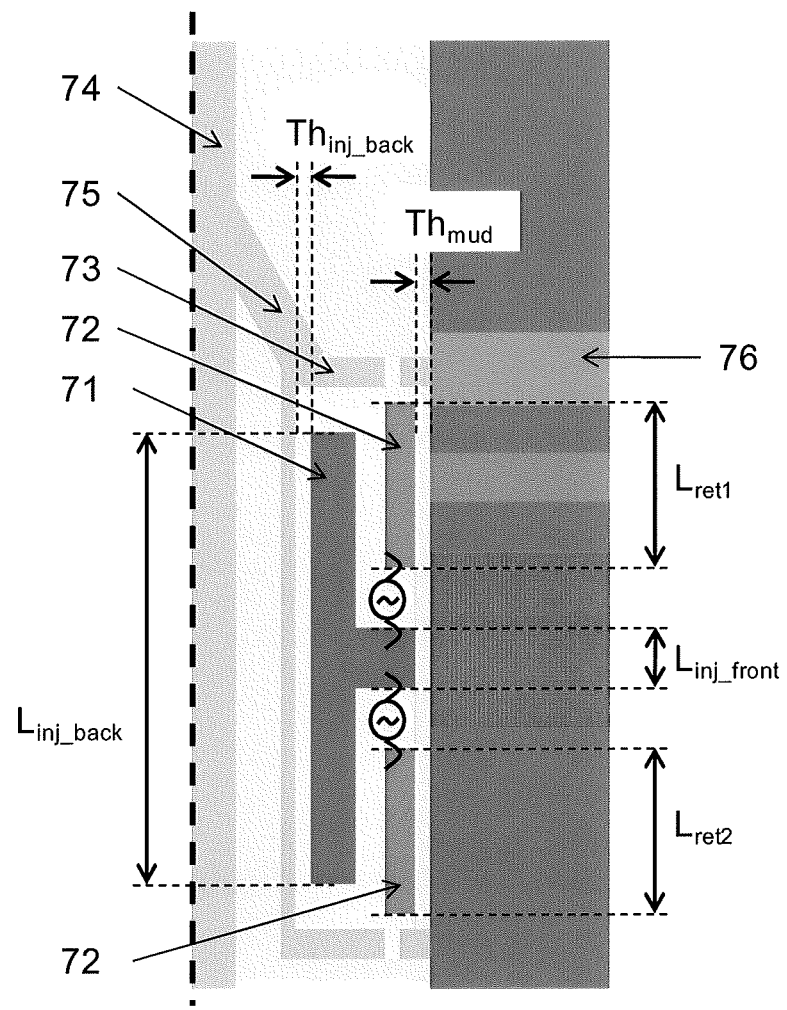
FIG. 7 shows a schematic diagram of a comparative example of a measurement system where the balancing condition may not be met.

FIG. 7 shows a comparative measurement system where a balancing condition may not be met. Compared to the measurement systems shown in FIGS. 1 and 4-6, this comparative measurement system includes a current injector electrode 71 that has an increased size so as to provide enough space to house the electronics necessary for the measurements. $L_{inj\_back}$ can for example be of the order of about 15 cm. At the same time, the insulation thickness ($Th_{inj\_back}$) has been decreased such that a pad 73 becomes thin enough (for example, about 40 mm) to be mounted (e.g., by an arm 75) on a tool body 74 that can pass a sufficiently small borehole. Thicker pads result in a tool that has a large diameter even with the pads closed. A tool with thick pads may therefore not be suitable for use in a small diameter borehole (for example, about 6 inch). $Th_{inj\_back}$ can for example be of the order of about 5 mm. As a result, even if the relative dielectric permittivity of the insulation material can be relatively small (for example, about 2.5), the capacitive coupling between the current injector electrode 71 and the conductive back plate of the pad 73 can still be quite strong. Therefore the electric impedance between the current injector electrode 71 and the pad back plate (or the tool body 74, because both are connected) can be low. At the same time, current return electrodes 72 are far away from the back plate of the pad 73, so only relatively small portions of the current return electrodes 72 face the pad back plate. Therefore the capacitive coupling between the current return electrodes 72 and the pad back plate can be relatively weak and hence the electrical impedance between the current return electrodes 72 and the pad back plate (or the tool body 74) can be quite high. On the front side of the pad 73, the total length of the current return electrodes 72 (i.e., $L_{ret1}+L_{ret2}$; which can, for example, be about 15 cm) is significantly larger than the length of the current injector electrode 71 (i.e., ($L_{inj\_front}$; which can, for example, be about 2 cm). As such, the capacitance between the current return electrodes 72 and the formation 76 can be substantially larger than the capacitance between the current injector electrode 71 and the formation 76. Therefore the impedance between the current return electrodes 72 and the formation 76 can be substantially smaller than the impedance between the current injector electrode 71 and the formation 76. In this case, the balancing condition may not be met, since on one hand the ratio of the electrical impedance between the current injector electrode 71 and the tool body 74 and the electrical impedance between the current return electrodes 72 and the tool body 74 can be significantly smaller than 1, while on the other hand the ratio of the electrical impedance between the current injector electrode 71 and the formation 76 and the electrical impedance between the current return electrodes 72 and the formation 76 can be significantly larger than 1.

Active balancing of impedance is not limited to the use of active, tuneable discrete electrical components such as tuneable capacitors, inductors and/or resistors, as discussed above with respect to FIGS. 6 and 6A. FIGS. 9-14, in addition to FIG. 6, provide different embodiments of active balancing using complete active systems. These embodiments provide systems for stabilizing resistivity measurements by actively balancing the system such that a resistivity measurement taken by the system is only sensitive to, for example, mud/formation impedance changes. That is, these embodiments provides active circuits that can monitor leakage currents through the measurement system and can actively cancel the leakage currents at an equilibrium point to provide which can allow for more accurate impedance measurements. This can be particularly useful when resistivity measurements of the foundation are being performed while the system is drilling a bore hole into the foundation.

Measurement systems that use active balancing, as discussed herein, can be part of a tool that is measuring in an existing borehole (e.g., wireline or statically installed), or is measuring in a borehole being created (i.e., an LWD (logging while drilling)/MWD (measurement while drilling) tool). Some examples of a wireline tool are described in U.S. Pat. No. 7,066,282 and US Patent Application Publication 2010/0013487. Some examples of an LWD/MWD tool are described in U.S. Pat. No. 7,242,194 and U.S. Pat. No. 7,256,582. One embodiment of a resistivity measuring tool is also described in U.S. Pat. No. 6,600,321.

These measurement systems can be placed entirely or partly on a pad, a mandrel, a stabilizer blade, a rotary sleeve, a centralizer, a drill pipe or other mechanical systems which can position the measurement system in a borehole. Examples of such tools that the measurement system may be part of include (guarded) 2, 3, and 4 terminal measurement tools Active balancing as described herein may refer to either (a) improving a balancing condition, or (b) reducing the effects of non-optimal balancing. In both instances, the object is to adjust the potential of the tool body so that it is approximate to the voltage of the formation so that there can be no potential difference (or a limited potential difference) between the tool body and the formation and therefore no current (or a limited current) passing directly between the tool body and the formation. When this occurs, leakage currents within the system can be suppressed.

A general balancing condition that can be used in the embodiments below is: $Zit/Zrt \approx Zif/Zrf$, where $Zit$ (i.e. $ZLI$) is the electrical impedance between a conductive injector electrode and a tool body, $Zrt$ (i.e. $ZLR$) is the electrical impedance between a conductive return electrode and a tool body, $Zif$ (i.e. $ZMI$) is the electrical impedance between the injector electrode and a formation, and $Zrf$ (i.e. $ZMR$) is the electrical impedance between a return electrode and a formation.

In some embodiments, the balancing condition can be stated as $Zsi/Zsr \approx (Zif)/Zrf$, where $Zsi$ is the electrical impedance between a conductive shield electrode (i.e. screen) and a conductive injector electrode, $Zsr$ is the electrical impedance between a conductive shield electrode and a conductive return electrode, $Zif$ is the electrical impedance between the injector electrode and a formation, and $Zrf$ is the electrical impedance between a return electrode and a formation.

In some cases, the two impedance ratios of a balancing condition differ by about 25% or less. In some cases, the two impedance ratios differ by about 10% or less. In some cases, the two impedance ratios differ by about 5% or less. In some cases, the two impedance ratios differ by about 1% or less. This leads to a measurement system that generates substantially no potential difference or only notable potential difference below an acceptable level between the tool body and the formation. Also, when reducing the effects of non-optimal balancing, no potential difference or only notable potential difference below an acceptable level between the tool body and the formation can be achieved. For example, any potential difference generated between the tool body and the formation can be less than a predetermined fraction of the potential difference between the current injector electrode and the current return electrode.

In some cases, the potential difference between the tool body and the formation can be about 25% or less than the potential difference between the current injector and return electrodes. In some cases, the potential difference between the tool body and the formation can be about 10% or less than the potential difference between the current injector and return electrodes. In some cases, the potential difference between the tool body and the formation can be about 5% or less than the potential difference between the current injector and return electrodes. In some cases, the potential difference between the tool body and the formation can be about 1% or less than the potential difference between the current injector and return electrodes. In those situations, the measurement system does not inject any significant or unacceptable levels of electromagnetic waves into the waveguide independent of the characteristics of the waveguide.

The embodiments provided below are directed to monitoring of current leakage through the measurement system, and to actively cancel leaking currents at an equilibrium point, so that impedance measurement between the electrodes will only be sensitive to mud/formation impedance changes. Monitoring of current leakage can be performed by measuring an electrical signal (voltage or current) between two of the following elements (wear plates, a tool body, screen(s), an injector electrode, and a return electrode), or by measuring an electrical signal using a coil as a measurement device. The monitored value can be then sent to a regulator that, based on the type of active balancing being performed, generates an adjustment signal for actively balancing the system. The adjustment signal can be then used to adjust an electrical impedance (between a shield electrode and an injector electrode, between a shield electrode and a return electrode, between a return electrode and a formation, between an injector electrode and a formation, or between a tool body and a shield electrode), or to use an electrical source to inject a signal directly or indirectly through an electronic component or through galvanic or inductive coupling.

In some embodiments, an additional electrode (i.e. shield electrode) can be provided. This shield electrode can be located in the system so that the impedance between measuring electrodes and the tool body can be approximately decomposed. This can be achieved by placing the shield electrode between the tool body and the measuring electrodes. Hereinafter, a shield electrode in this position can be identified as a shield of the first kind.

In other embodiments, the shield electrode can be located between the measuring electrodes, so that the leakage impedance between the measuring electrodes through imperfect insulating material can be approximated. Hereinafter, a shield electrode in this position can be identified as a shield of the second kind.

For shields of the first kind, it can be possible to measure a voltage drop between the shield and the tool body, which will be representative of the total current flowing between the shield electrode and tool body. A current source can be then inserted between the shield electrode and the tool body, which will cancel the total current flowing through the shield electrode. This way the leakage current between measuring electrodes and the tool body can be cancelled or at least suppressed.

For shields of the second kind, it can be possible to measure the drop of voltage between the shield electrode and any of the measuring electrodes. It becomes then possible to also insert a source of current between this shield and any of the measuring electrodes that will cancel or at least suppress the total current flowing through this shield electrode, cancelling or at least suppressing then also the leakage current between the measuring electrodes.

By reciprocity, the preceding explanation can be changed so that current sources are swapped with current measurements and voltage drop measurements with voltage sources.

In other embodiments, a current/voltage transformer (i.e. antenna) located on the current path between tool body and measuring electrodes can be provided. Because of its location, the antenna can be able to measure current leakage through tool body. The antenna can then measure this current and impose on a second winding (either located around the same high $\mu$ material or on a second transformer located nearby) that will cancel the total current leakage current.

The use of a shield electrode and an antenna, as described herein, can be used independently or together to enhance the cancelling of leakage currents. For example, in some embodiments the use of shields of the first and second kind with the corresponding voltage and current measurements and sources are provided along with antennas.

Figure 8:
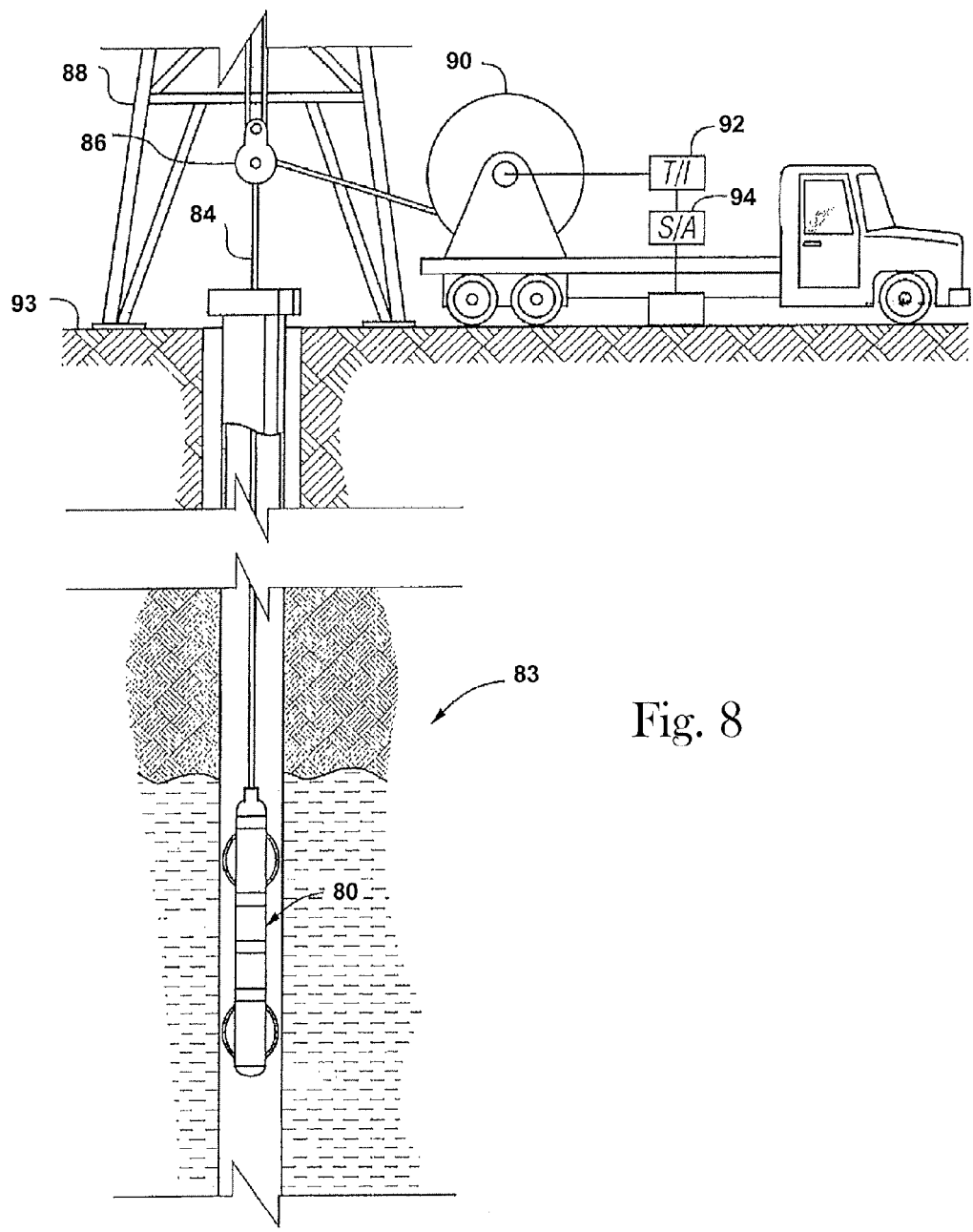
FIG. 8 shows the resistivity measuring tool suspended in a borehole, according to one embodiment.

FIG. 8 shows generally one embodiment of a resistivity measuring tool 80 that uses an active system for balancing the impedance. The resistivity measuring tool 80, suspended in a borehole, penetrates earth formations such as 83, from a suitable cable 84 that passes over a sheave 86 mounted on drilling rig 88. The cable 84 includes a stress member and conductors for transmitting commands to the tool 80 and for receiving data back from the tool 80 as well as power for the tool 80. The tool 80 can be raised and lowered by draw works 90. Electronic module 92, on the surface 93, transmits the required operating commands downhole and in return, receives data back which may be recorded on an archival storage medium of any desired type for concurrent or later processing. The data may be transmitted in analog or digital form. Data processors such as a suitable computer 94, may be provided for performing data analysis in the field in real time or the recorded data may be sent to a processing center or both for post processing of the data.

Figure 9:
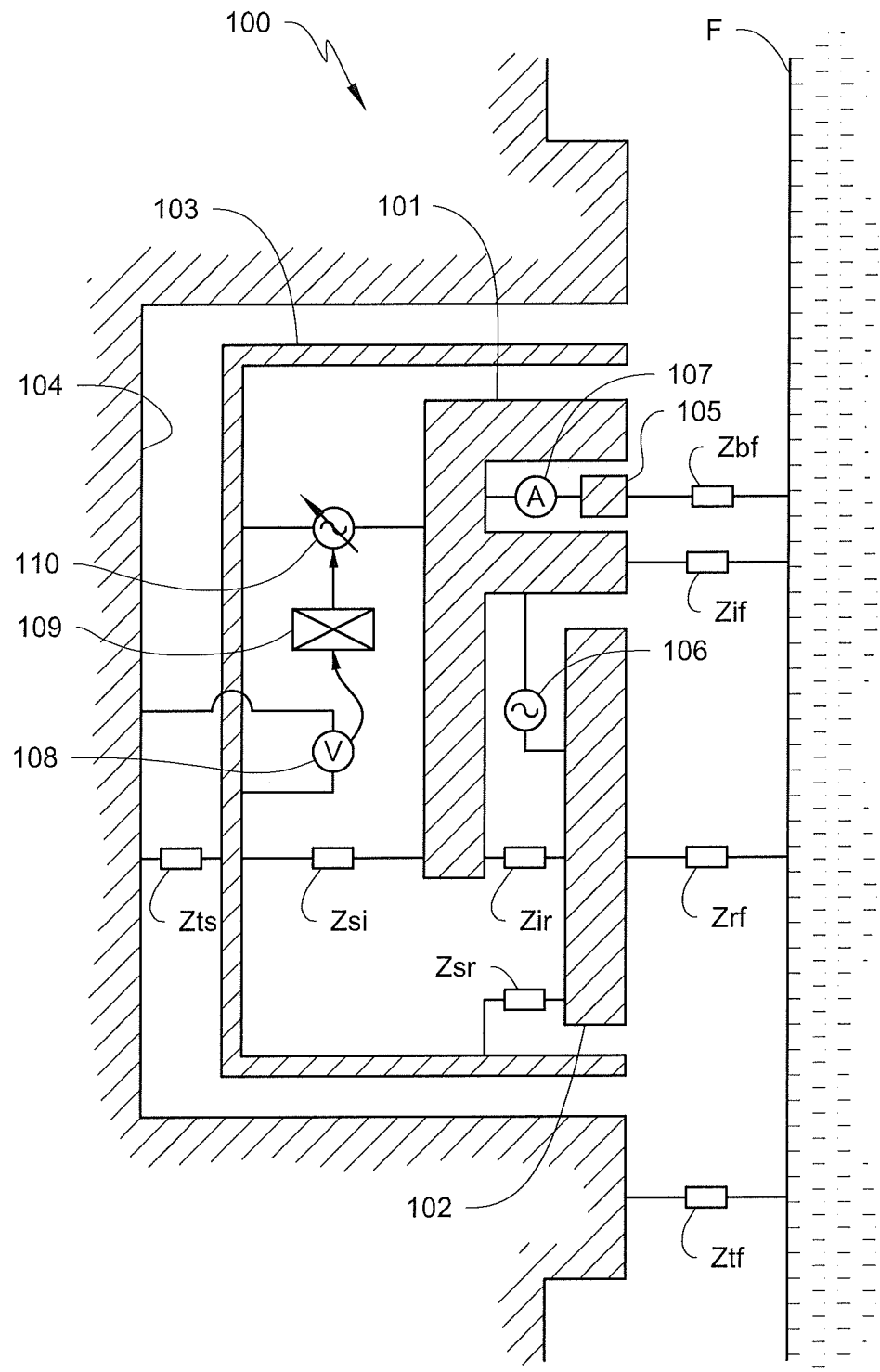
FIG. 9 shows a schematic diagram of another example of a measurement system that uses active balancing according to the present disclosure.
Figure 10:
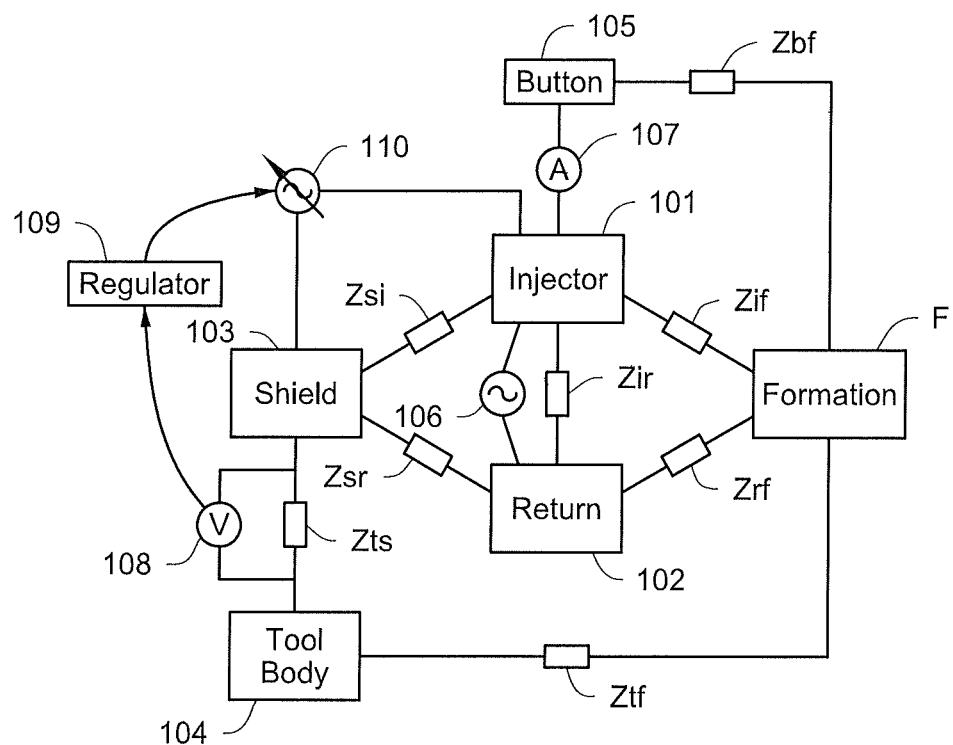
FIG. 10 shows a diagram of an electrical equivalent of FIG. 9.

FIGS. 9-10 show an example of a measurement system 100 using a complete active system that improves a balancing condition. The measurement system 100 includes a current injector electrode 101, a current return electrode 102, and a shield electrode 103 attached to a conductive tool body 104 which can be entered in the borehole (usually over several hundreds of meters up to several kilometers deep), e.g., a tool mandrel or a drill pipe. The system 100 also includes a button 105, a generator injector return 106 and a current measurement device 107.

The system 100 also includes a voltage measurement device 108, a regulator 109 and an adjustable current source 110. FIGS. 9 and 10 also show a plurality of electrical impedances between different elements of the system 100 including: an electrical impedance between the tool body 104 and the shield electrode 103 (Zts); an electrical impedance between the tool body 104 and a formation F(Ztf); an electrical impedance between the shield electrode 103 and the return electrode 102 (Zsr); an electrical impedance between the shield electrode 103 and the injector electrode 101 (Zsi); an electrical impedance between the injector electrode 101 and the return electrode 102 (Zir); an electrical impedance between the return electrode 102 and the formation F (Zrf); an electrical impedance between the injector electrode 101 and the formation F (Zif); and an electrical impedance between the button 105 and the formation F (Zbf).

In operation, a voltage can be applied with the generator injector return 106 and the voltage between the button 105 and the injector electrode 101 can be kept at 0 volts or to a very small value (in orders of magnitude) with respect to the voltage across the injector electrode 101 and the return electrode 102. That is, the measurement current can be designed to pass between the return electrode 102 and the injector electrode 101 via Zrf and Zif, and between return electrode 102 and the button 105 via Zrf and Zbf. The current between the button 105 and the injector electrode 101 can be measured with the current measurement device 107 to determine the impedance from the formation F. In some embodiments, the current measurement device 107 can be a current meter.

In this example, the system 100 can be actively balanced using the voltage measurement device 108, the regulator 109 and the adjustable current source 110 to maintain the balancing condition: $Zsi/Zsr \approx (Zif+Zbf)/Zrf$. In particular, the voltage measurement device 108 monitors the voltage between the shield electrode 103 and the tool body 104. Based on the voltage monitored by the voltage measurement device 108, the regulator 109 can generate an adjustment signal for the adjustable current source 110. The adjustable current source 110 adjusts a current signal supplied to the shield electrode 103 to maintain the balancing condition $Zsi/Zsr \approx (Zif+Zbf)/Zrf$. In contrast, for example, FIG. 6 provides a measurement system that can use a tuneable variable capacitor component 69 to maintain a balancing condition.

By maintaining this balancing condition $Zsi/Zsr \approx (Zif+Zbf)/Zrf$, the voltage between the tool body 104 and the shield electrode 103 can be approximately 0 volts, thereby ensuring that the net leakage current passing through Zsr, Zsi, Ztf and Zts can be at or near 0 amps.

Figure 11:
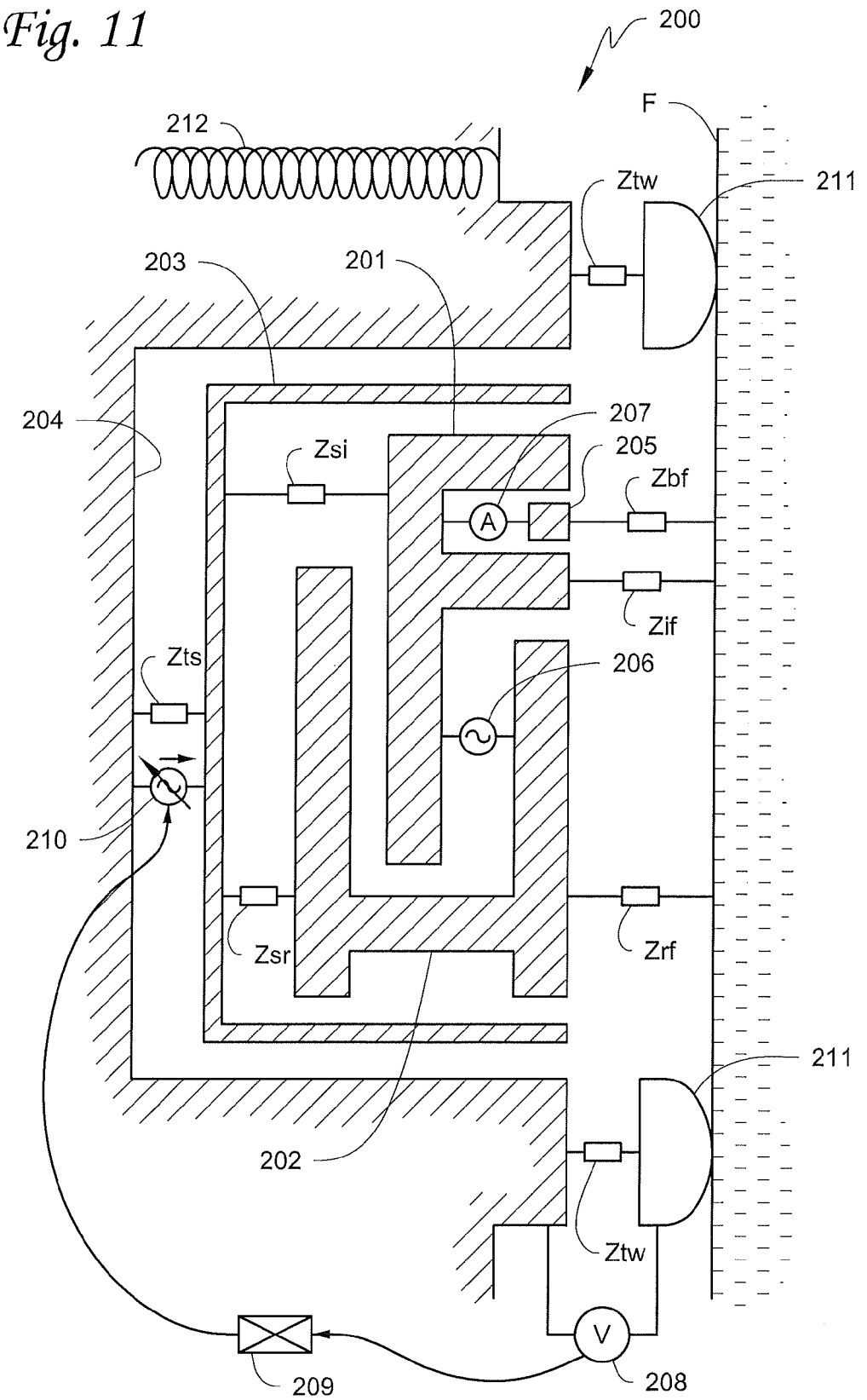
FIG. 11 shows a schematic diagram of another example of a measurement system that uses active balancing according to the present disclosure.

FIG. 11 shows an example of a measurement system 200 using a complete active system that reduces the effects of non-optimal balancing. The measurement system 200 includes a current injector electrode 201, a current return electrode 202, and a shield electrode 203 attached to a conductive tool body 204 which can be entered in the borehole (usually over several hundreds of meters up to several kilometers deep), e.g., a tool mandrel or a drill pipe. The system 200 also includes a button 205, a generator injector return 206, a current measurement device 207, wear plates 211 and a coil 212. The wear plates 211 can be used to determine the potential between the tool body 203 and the formation F which can be used for balancing the system 200. The coil 212 wraps around the tool body 204 and can be used as to measure a current passing through an element of the system 200, or can be used as a voltage source to supply a voltage between the tool body 204 and the formation F.

The system 200 also includes a voltage measurement device 208, a regulator 209 and an adjustable current source 210. FIG. 11 also shows a plurality of electrical impedances between different elements of the system 200 including: an electrical impedance between the tool body 204 and the shield electrode 203 (Zts); an electrical impedance between the tool body 204 and wear plates 211(Ztw); an electrical impedance between the shield electrode 203 and the return electrode 202 (Zsr); an electrical impedance between the shield electrode 203 and the injector electrode 201 (Zsi); an electrical impedance between the injector electrode 201 and the return electrode 202 (Zir); an electrical impedance between the return electrode 202 and the formation F (Zrf); an electrical impedance between the injector electrode 201 and the formation F (Zif); and an electrical impedance between the button 205 and the formation F (Zbf).

An electrical impedance between the tool body 204 and the formation F (Ztf) may be determined for each wear plate 211 and the total impedance between the tool body 204 and the formation F can be calculated through the parallel combination of all Ztw impedances and the geometric impedance between the tool body 204 and the formation F (which depends on the coaxial lines formed by the collar, the drilling mud and the formation F). In some embodiments, no wear plates 211 are provided, and the impedance Ztw below can be replaced by the impedance Ztf. The impedance Ztf can then be dominated by the geometric impedance between the tool body 204 and the formation F.

In operation, a voltage can be applied with the generator injector return 206 and the voltage between the button 205 and the injector electrode 201 can be kept at 0 volts or to a very small value with respect to the potential difference between the injector electrode and the return electrode. That is, the measurement current can be designed to pass between the return electrode 202 and the injector electrode 201 via Zrf and Zif, and between return electrode 202 and the button 205 via Zrf and Zbf. The current between the button 205 and the injector electrode 201 can be measured with the current measurement device 207 to determine the impedance from the formation F. In some embodiments, the current measurement device 207 can be a current meter.

In this example, the system 200 can be actively balanced using the voltage measurement device 208, the regulator 209 and the adjustable current source 210 to reduce the effect of non-optimal balancing when the balancing condition $Zsi/Zsr \approx (Zif+Zbf)/Zrf$ cannot be achieved. When the balancing condition cannot be achieved a voltage between the shield electrode 203 and the formation F exists, resulting in intrinsic leakage currents passing through Zsi, Zsr, Zts and Ztw. To counter balance the voltage between the shield electrode 203 and the formation F, a voltage between the tool body 204 and the shield electrode 203 can be provided that can be approximately opposite to the voltage between the shield electrode 203 and the formation F.

In particular, the voltage measurement device 208 monitors the voltage between the tool body 204 and one of the wear plates 211. Based on the voltage monitored by the voltage measurement device 208, the regulator 209 generates an adjustment signal for the adjustable current source 210. The adjustable current source 210 adjusts a current signal supplied to the shield electrode 203 to produce a voltage between the tool body 204 and the shield electrode 203 that can be approximately opposite to the voltage between the shield electrode 203 and the formation F. By counteracting the voltage between the shield electrode 203 and the formation F, the net leakage current passing through Zsr, Zsi, Zts and Ztw can be at or near 0 amps.

Figure 12:
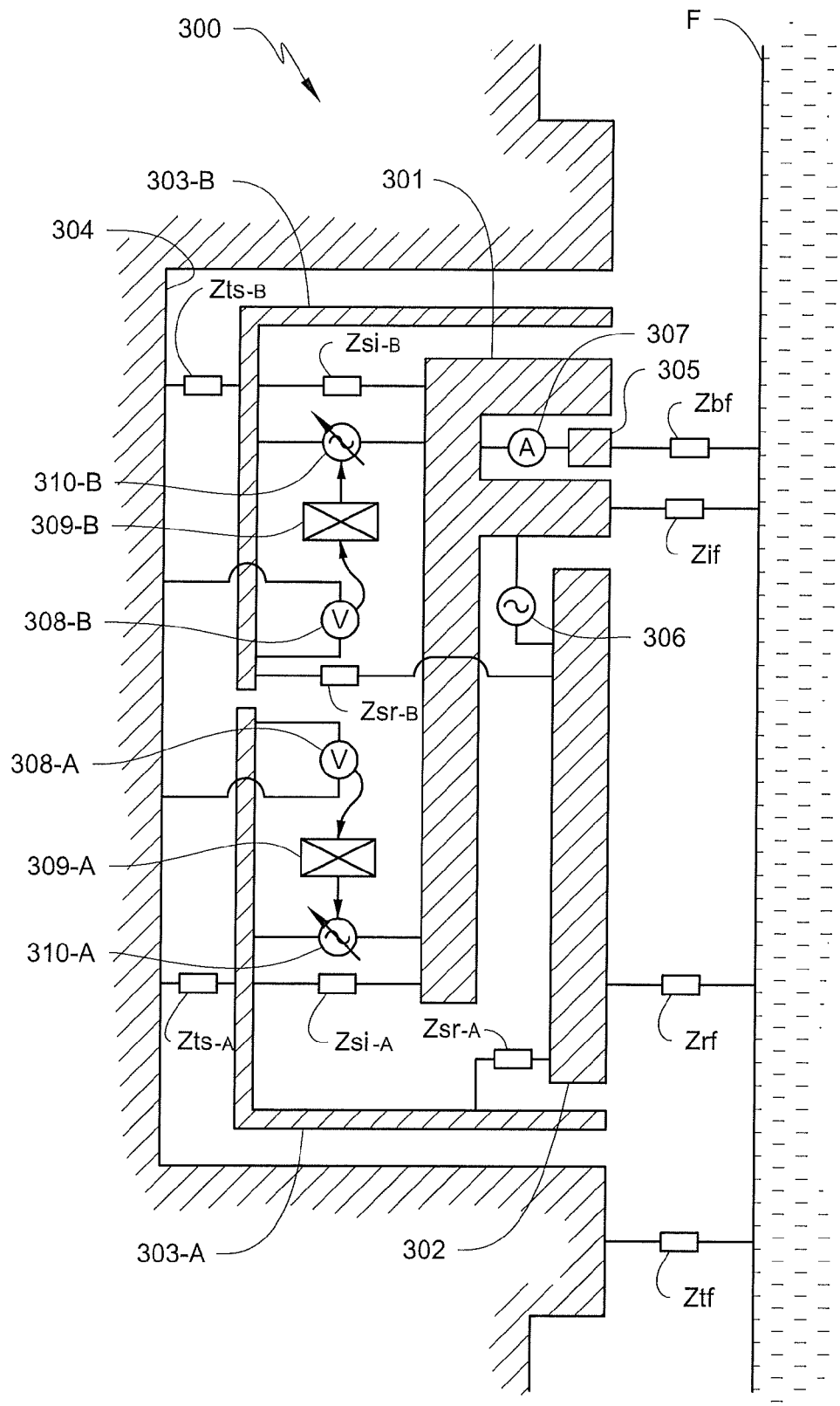
FIG. 12 shows a schematic diagram of yet another example of a measurement system that uses active balancing according to the present disclosure.
Figure 13:
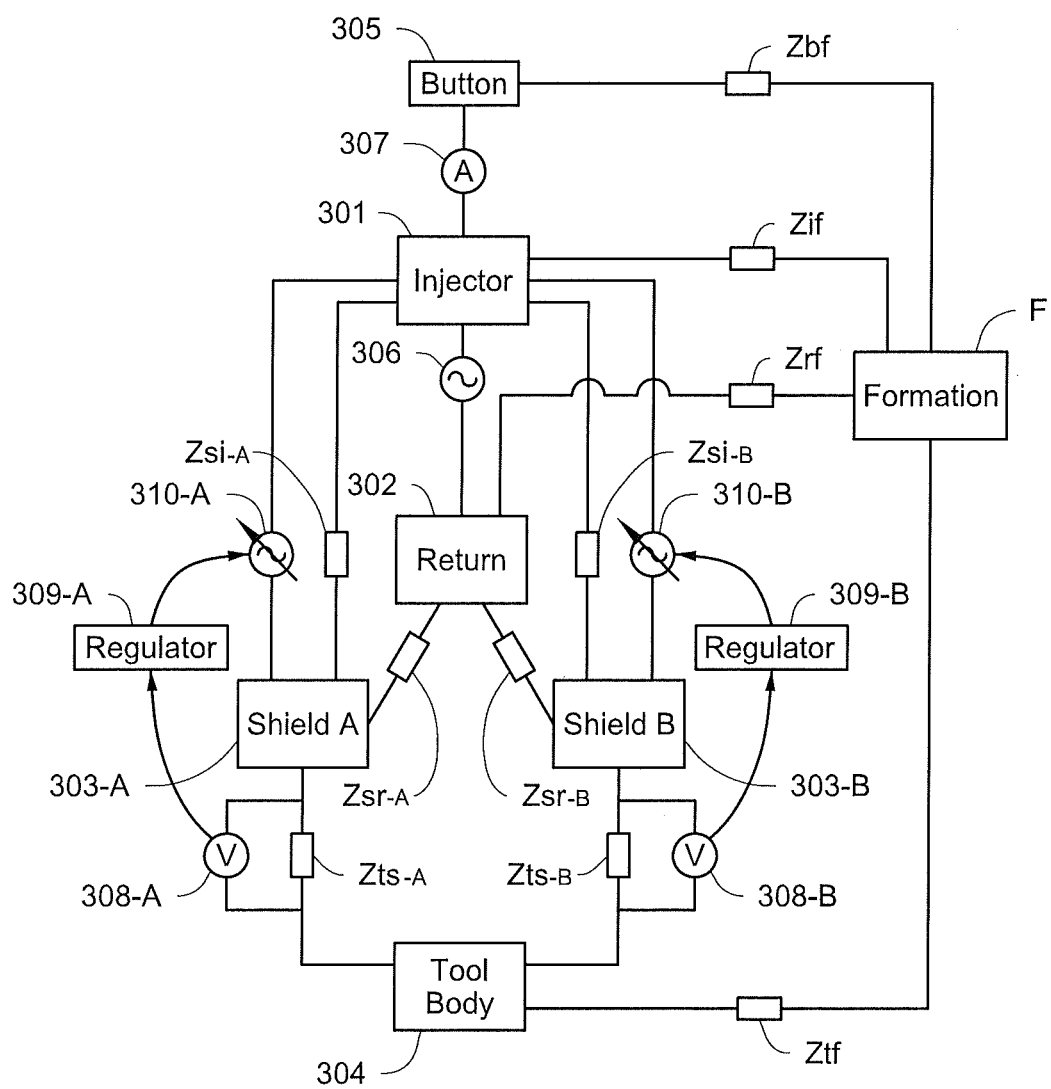
FIG. 13 shows a diagram of an electrical equivalent of FIG. 12.

FIGS. 12-13 show an example of a measurement system 300 using a complete active system to improve the balancing condition. The measurement system 300 includes a current injector electrode 301, a current return electrode 302, and shield electrodes 303A, 303B attached to a conductive tool body 304 which can be entered in the borehole (usually over several hundreds of meters up to several kilometers deep), e.g., a tool mandrel or a drill pipe. The system 300 also includes a button 305, a generator injector return 306 and a current measurement device 307.

In this embodiment, active balancing can be achieved with multiple shield electrodes 303A, 303B that are side by side. Each of the shield electrodes 303A, 303B has separate active balancing performed to take into account different frequency or electrode sizes that may cause different wave effects and phase shifts to occur along the surface of each of the conductive elements within the system 300. In this configuration, each shield electrode 303A, 303B can be kept small enough to be effective at high frequencies where phase shifts can occur across a single part of the metallic body while still shielding the tool body 304 from the injector electrode 301 and the return electrode 302.

The system 300 further includes voltage measurement devices 308A, 308B, regulators 309A, 309B and adjustable current sources 310B. The voltage measurement devices 308A, 308B each measure a voltage between the shield electrodes 303A, 303 and the tool body 304, respectively. Based on the measured voltage, the regulators 309A, 309B each generate a separate adjustment signal for each of the adjustable current sources 310A, 310B. The adjustment signals are each sent to the respective adjustable current source 310A, 310B which adjusts the respective current signal applied to the shield electrode 303A, 303B.

FIGS. 12 and 13 also show a plurality of electrical impedances between different elements of the system 300 including: an electrical impedance between the tool body 304 and the shield electrodes 303A, 303B (Zts-A, Zts-B); an electrical impedance between the tool body 304 and a formation F(Ztf); an electrical impedance between the shield electrodes 303A, 303B and the return electrode 302 (Zsr-A, Zsr-B); an electrical impedance between the shield electrodes 303A, 303B and the injector electrode 301 (Zsi-A, Zsi-B); an electrical impedance between the injector electrode 301 and the return electrode 302 (Zir); an electrical impedance between the return electrode 302 and the formation F (Zrf); an electrical impedance between the injector electrode 301 and the formation F (Zif); and an electrical impedance between the button 305 and the formation F (Zbf).

In this example, the system 300 can be actively balanced using the voltage measurement devices 308A, 308B, the regulators 309A, 309B and the adjustable current sources 310A, 310B to maintain the balancing conditions: $Zsi\text{-}A/Zsr\text{-}A \approx (Zif+Zbf)/Zrf$ and $Zsi\text{-}B/Zsr\text{-}B \approx (Zif+Zbf)/Zrf$. In particular, the voltage measurement devices 308A, 308B each monitor the respective voltage between the shield electrodes 303A, 303B and the tool body 304. Based on the voltages monitored by the voltage measurement devices 308A, 308B, the regulators 309A, 309B each generate a respective adjustment signal for the adjustable current sources 310A, 310B. The adjustable current sources 310A, 310B each adjust a respective current signal supplied to the shield electrodes 303A, 303B to maintain the balancing conditions $Zsi\text{-}A/Zsr\text{-}A \approx (Zif+Zbf)/Zrf$ and $Zsi\text{-}B/Zsr\text{-}B \approx (Zif+Zbf)/Zrf$.

By maintaining this balancing conditions $Zsi\text{-}A/Zsr\text{-}A \approx (Zif+Zbf)/Zrf$ and $Zsi\text{-}B/Zsr\text{-}B \approx (Zif+Zbf)/Zrf$, the voltages between the tool body 304 and the shield electrodes 303A, 303B are each approximately 0 volts, thereby allowing the leakage current passing through each of Zts-A and Zts-B to be approximately 0 amps.

Figure 14:
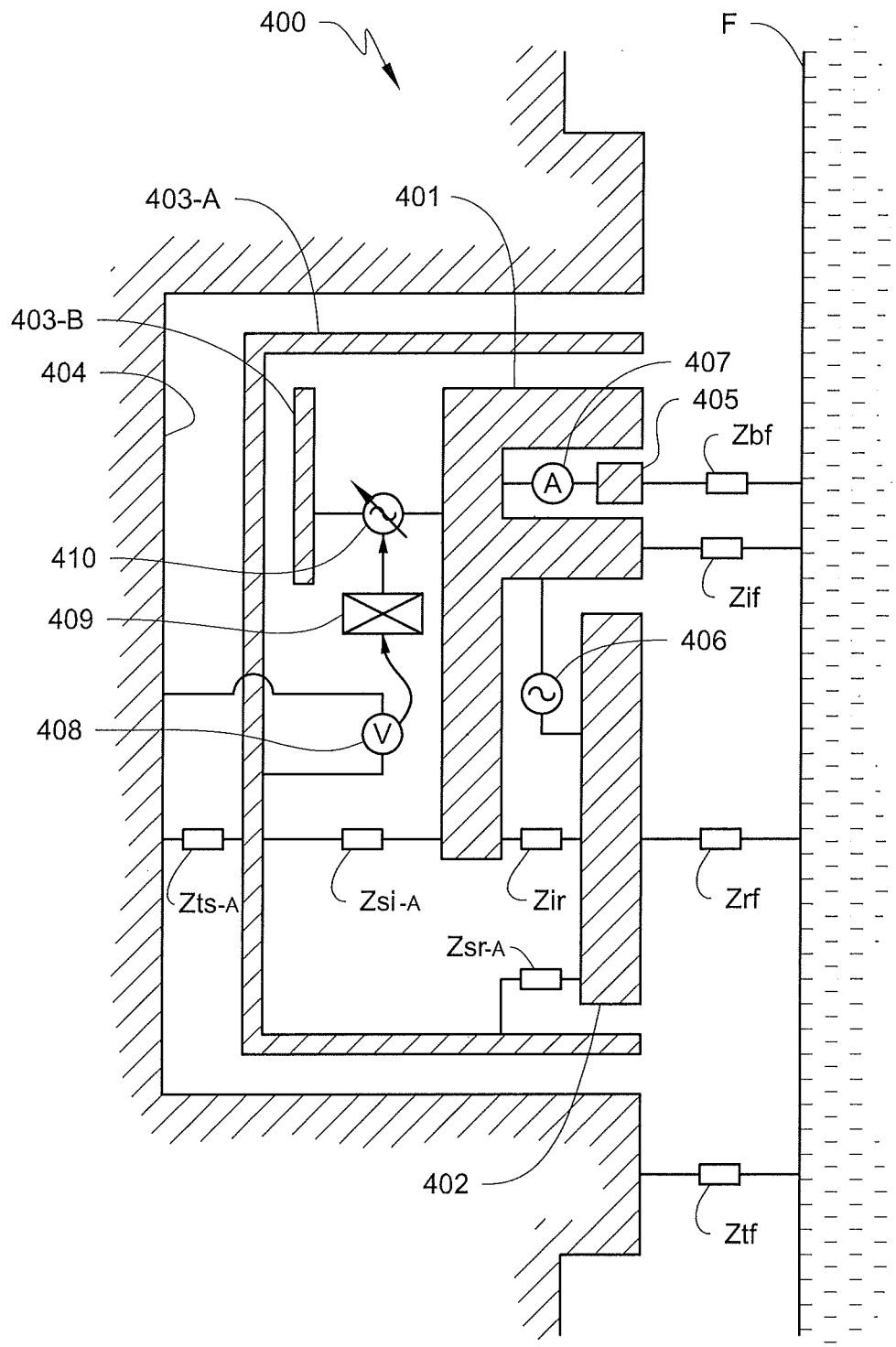
FIG. 14 shows a schematic diagram of yet another example of a measurement system that uses active balancing according to the present disclosure.

FIG. 14 shows yet another example of a measurement system 400 using an active regulation system with active balancing. The measurement system 400 includes a current injector electrode 401, a current return electrode 402, and shield electrodes 403A and 403B attached to a conductive tool body 404 which can be entered in the borehole (usually over several hundreds of meters up to several kilometers deep), e.g., a tool mandrel or a drill pipe. The system 400 also includes a button 405, a generator injector return 406 and a current measurement device 407.

The system 400 further includes a voltage measurement device 408, a regulator 409 and an adjustable voltage source 410 coupled between the shield electrode 403B and the injector electrode 401. The voltage measurement device 408 measures a voltage between the shield electrode 403A and the tool body 405. Based on the measured voltage, the regulator 409 generates an adjustment signal based on an active regulation to maintain the balancing condition $Zsi\text{-}A/Zsr\text{-}A \approx (Zif+Zbf)/Zrf$. The adjustment signal can be sent to the adjustable voltage source 410 which adjusts the voltage signal applied between the shield electrode 403B and the injector electrode 401.

Figure 15:
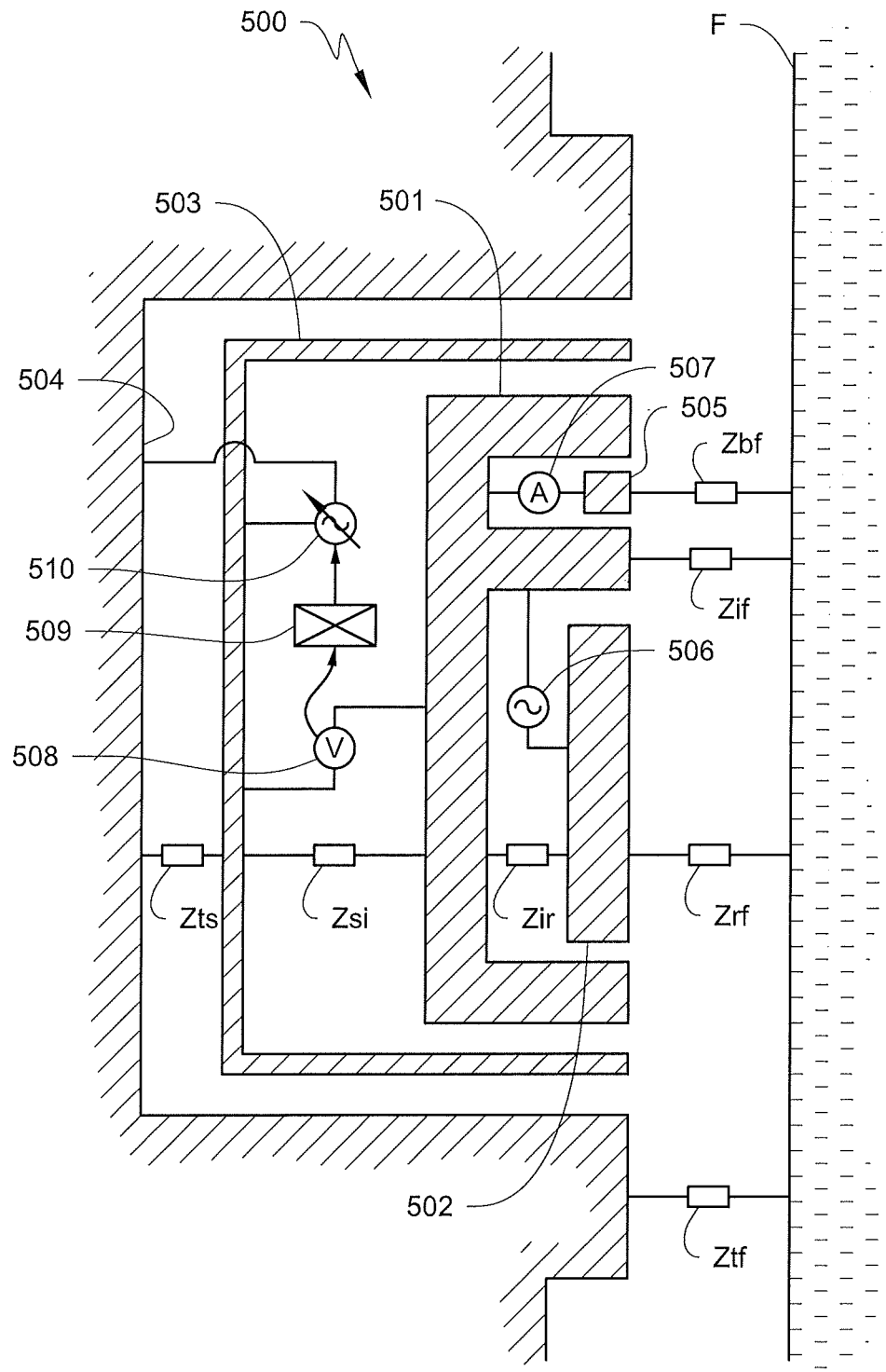
FIG. 15 shows a schematic diagram of an example of a measurement system that uses an active regulation system without balancing according to the present disclosure.
Figure 16:
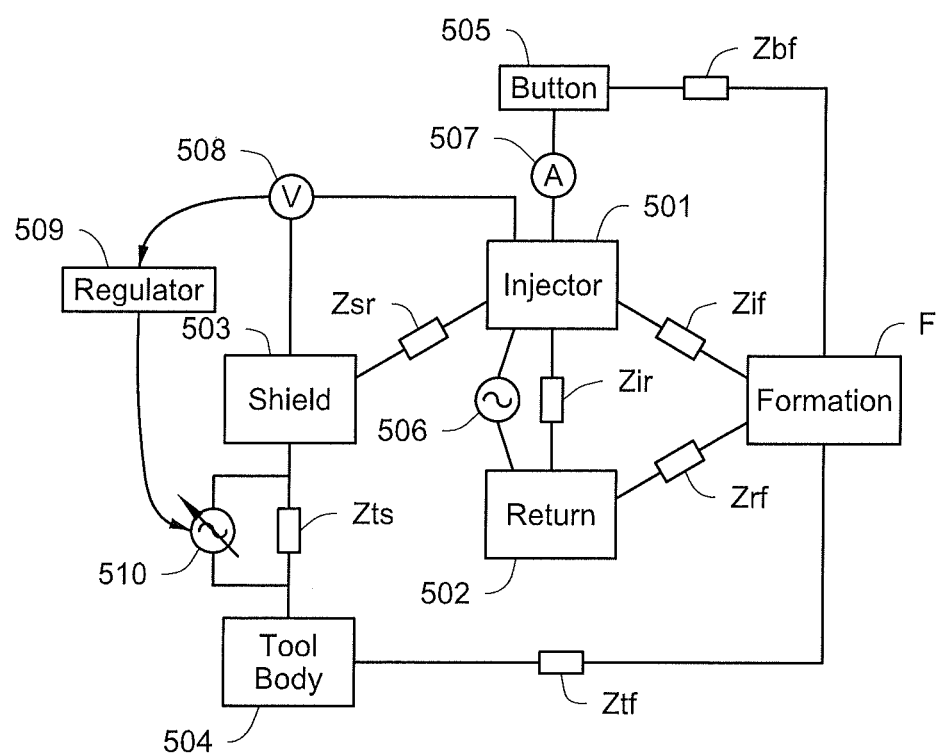
FIG. 16 shows a diagram of an electrical equivalent of FIG. 15.

FIGS. 15-16 show an example of a measurement system 500 using an active regulation system without active balancing. The measurement system 500 includes a current injector electrode 501, a current return electrode 502, and a shield electrode 503 attached to a conductive tool body 304 which can be entered in the borehole (usually over several hundreds of meters up to several kilometers deep), e.g., a tool mandrel or a drill pipe. The system 500 also includes a button 505, a generator injector return 506 and a current measurement device 507.

The system 500 further includes a voltage measurement device 508, a regulator 509 and an adjustable current source 510. The voltage measurement device 508 measures a voltage between the shield electrode 503 and the injector electrode 501. Based on the measured voltage, the regulator 509 generates an adjustment signal based on an active regulation in order to diminish leakage currents. The adjustment signal can be sent to the adjustable current source 510 which adjusts the current signal applied to the shield electrode 503.

As shown in FIG. 15, the injector electrode 501 surrounds the return electrode 502 such that there is no electrical impedance between the shield electrode 503 and the return electrode 502 (see FIG. 16).

Figure 17:
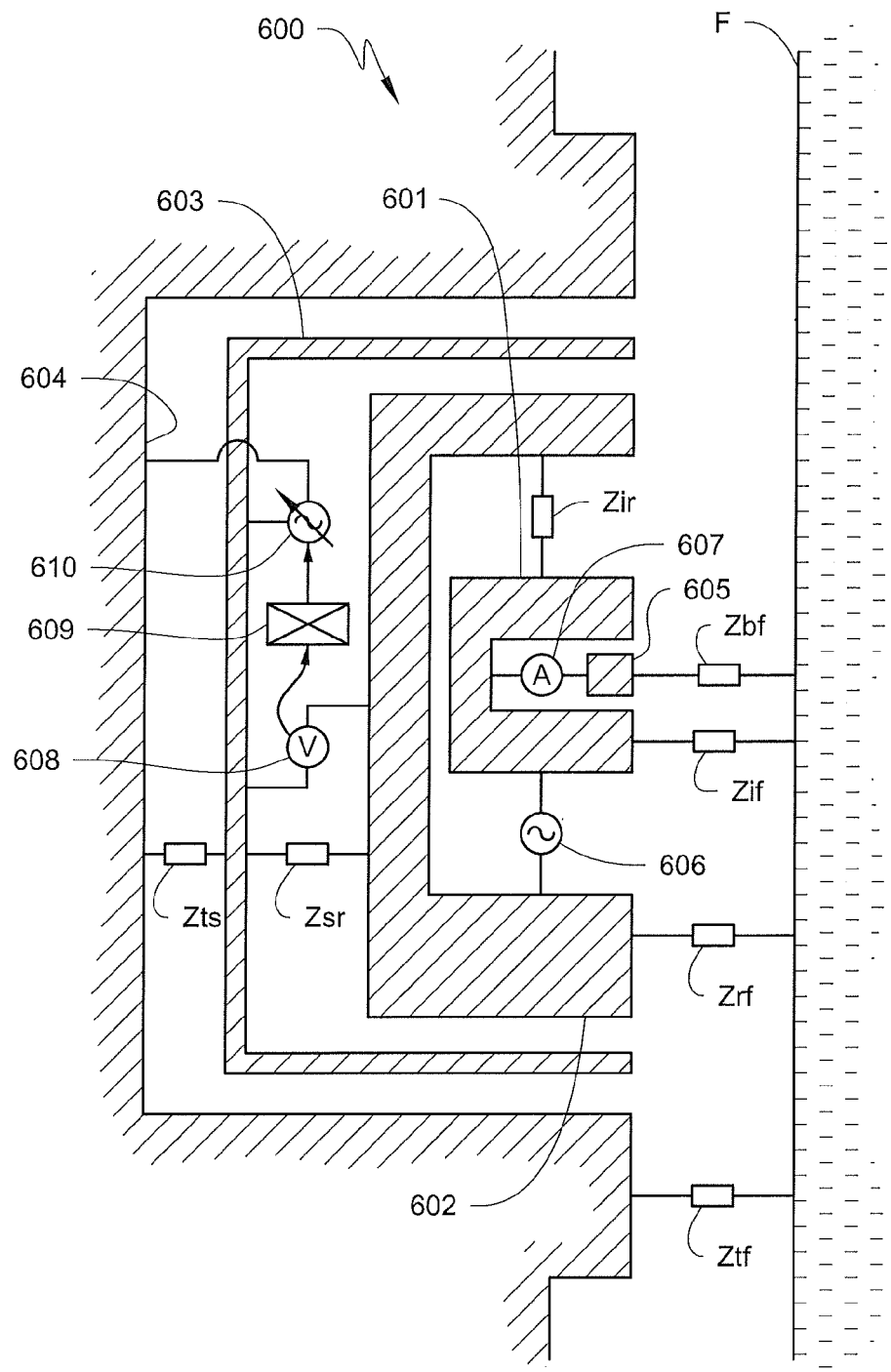
FIG. 17 shows a schematic diagram of an example of a measurement system that uses an active regulation system without balancing according to the present disclosure.
Figure 18:
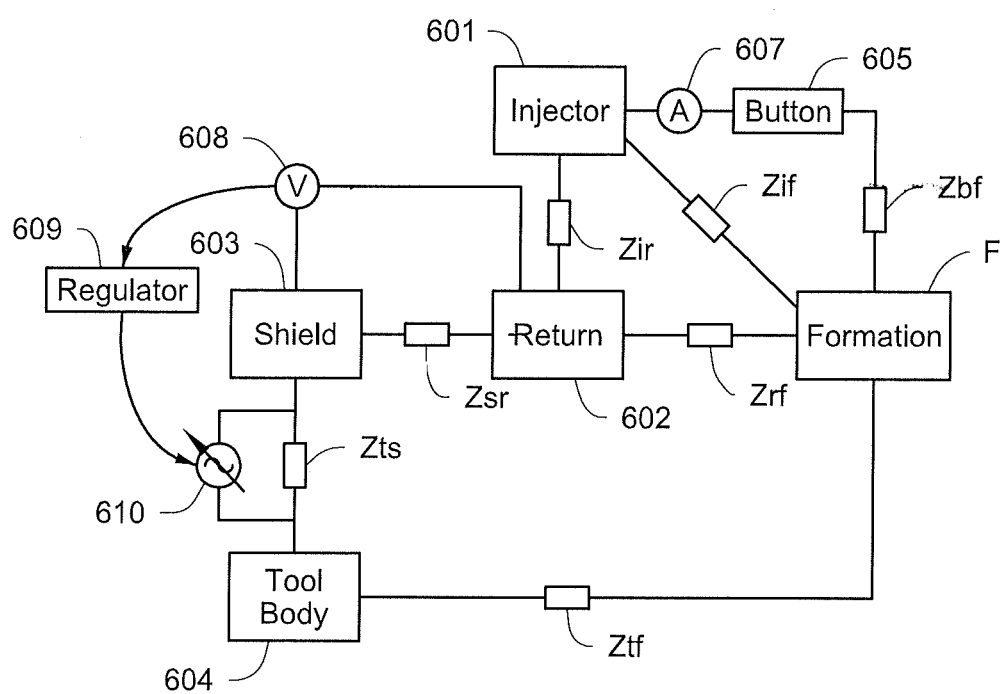
FIG. 18 shows a diagram of an electrical equivalent of FIG. 18.

FIGS. 17-18 show another example of a measurement system 600 using an active regulation system without active balancing. The measurement system 600 includes a current injector electrode 601, a current return electrode 602, and a shield electrode 603 attached to a conductive tool body 604 which can be entered in the borehole (usually over several hundreds of meters up to several kilometers deep), e.g., a tool mandrel or a drill pipe. The system 600 also includes a button 605, a generator injector return 606 and a current measurement device 607.

The system 600 further includes a voltage measurement device 608, a regulator 609 and an adjustable current source 610. The voltage measurement device 608 measures a voltage between the shield electrode 603 and the return electrode 602. Based on the measured voltage, the regulator 609 generates an adjustment signal based on an active regulation in order to diminish leakage currents. The adjustment signal can be sent to the adjustable current source 610 which adjust the current signal applied to the shield electrode 603.

As shown in FIG. 17, the return electrode 602 surrounds the injector electrode 601 such that there is no electrical impedance between the shield electrode 603 and the injector electrode 601 (see FIG. 18).

The embodiments shown in FIGS. 6, 6A, 9-14 are not limiting. For example, in some embodiments no shield electrodes are used. In other embodiments, multiple shield electrodes are used and positioned either side by side, layered or a combination of both. Also, in some embodiments, only a single wear plate is provided, while in other embodiments multiple wear plates are provided, and in yet some other embodiments no wear plates are provided. If a wear plate is not provided the electrical impedance between the tool body and the formation may be close to infinity.

Further, multiple injector electrodes and/or multiple return electrodes may be used. In some embodiments, the tool body can be replaced with a mandrel-arm-pad. Moreover, the electrical impedances between the shield electrode and the injector electrode, the return electrode and/or the tool body may consist of multi-level parallel and/or series combinations of geometric capacitance, resistance, inductance and fixed or variable electrical components such as, for example, a capacitor, an inductor, a resistor, a switch, a pin-diode, a varicap, a transistor, etc.

Also, the electrical impedance between the shield electrode and the injector electrode may be close to infinity if the return electrode wraps around the injector electrode, as shown in FIG. 14. Similarly, the electrical impedance between the shield electrode and the return electrode may be close to infinity if the injector electrode wraps around the return electrode, as shown in FIG. 12.

Figure 19A:
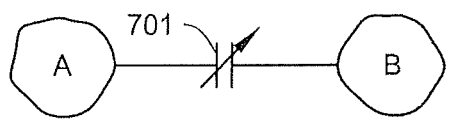
FIGS. 19A-19D show several implementations of a variable impedance element that can be used in an active balancing system according to the present disclosure.
Figure 19B:
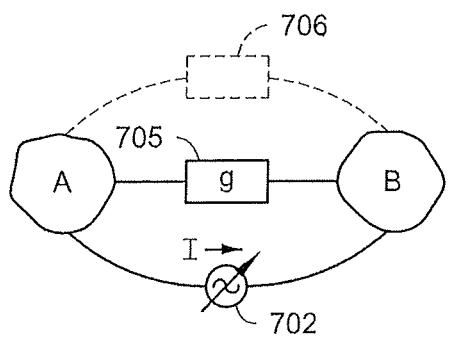
Figure 19C:
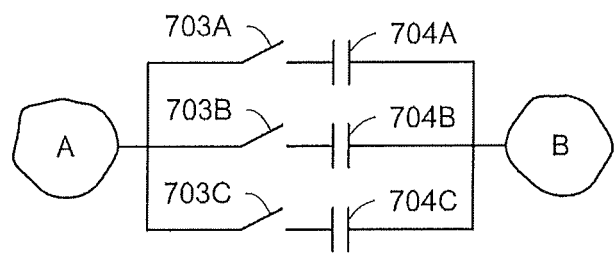
Figure 19D:
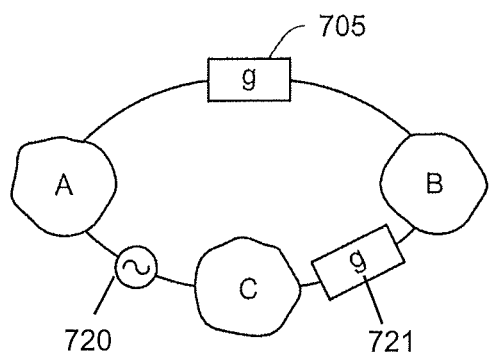

FIGS. 19A-19D show several different ways to implement a variable impedance component within the active balancing systems discussed above. In particular, FIG. 19A shows that a variable component 701 such as a varicap (i.e. variable capacitor) may be used between two conductive bodies A and B. FIG. 19B shows that a geometric impedance component 705 between conductive bodies A and B can be varied by adding an adjustable current source 702 in parallel with the geometric impedance component 705, thereby creating an additional impedance component 706. FIG. 19C shows that multiple sets of switches 703A-C and capacitors 704A-C in parallel between conductive bodies A and B can be used to implement a variable impedance component. FIG. 19D shows that a geometric impedance 705 between conductive bodies A and B can be varied by placing a voltage source 720 between conductive bodies A and C and another geometric impedance 721 between conductive bodies B and C. Also, a variable impedance can be replaced by a fixed impedance element with a controlled current source in parallel or a controlled voltage source in parallel.

Figure 20A:
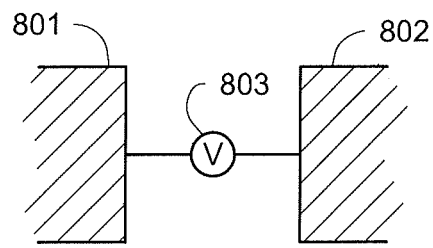
FIGS. 20A-20C show that a voltage measurement device can be replaced by a current measurement device and at least one impedance element that can be used in an active balancing system according to the present disclosure.
Figure 20B:
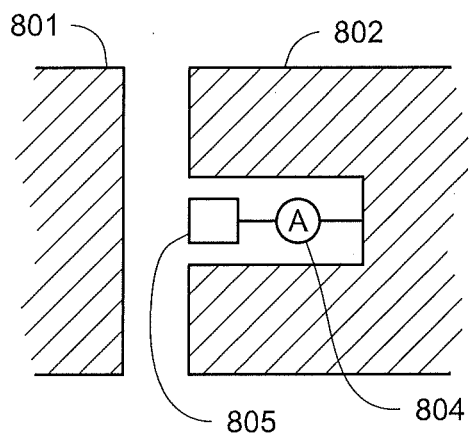
Figure 20C:
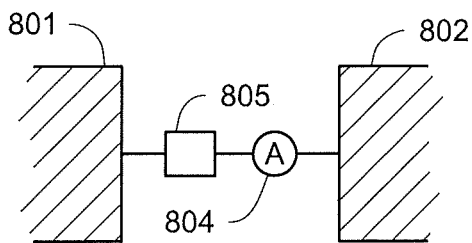

FIGS. 20A-20C show that a voltage measurement device 803 between conductive bodies 801 and 802 can be replaced by a current measurement device 804 and at least one impedance element 805 that can be used in an active balancing system according to the present disclosure.

Figure 21A:
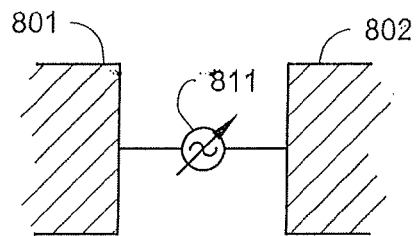
FIGS. 21A-21C show that an adjustable current source can be replaced by an adjustable voltage source and at least one impedance element that can be used in an active balancing system according to the present disclosure.
Figure 21B:
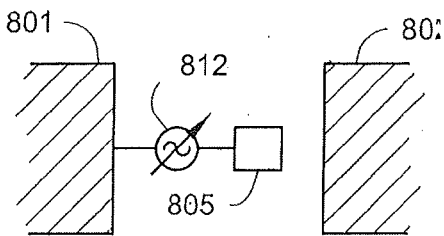
Figure 21C:
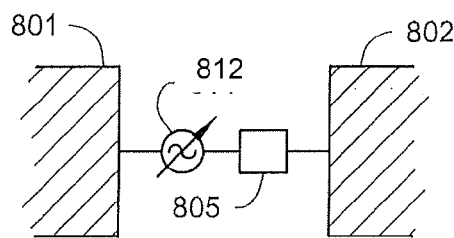

FIGS. 21A-21C show that an adjustable current source 811 between conductive bodies 801 and 802 can be replaced by an adjustable voltage source 812 and at least one impedance element 805 that can be used in an active balancing system according to the present disclosure.

Figure 22A:
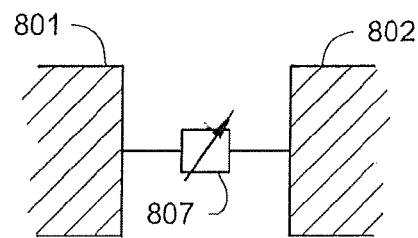
FIGS. 22A-22C show another set of different implementations of a variable impedance element that can be used in an active balancing system according to the present disclosure.
Figure 22B:
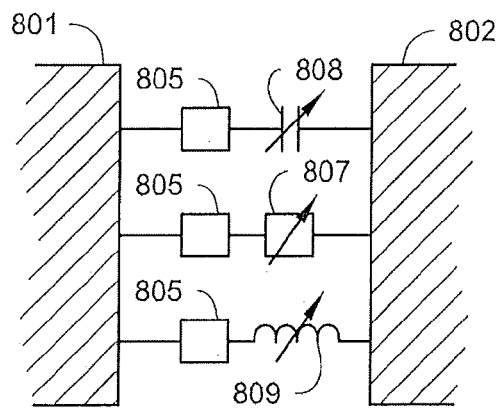
Figure 22C:
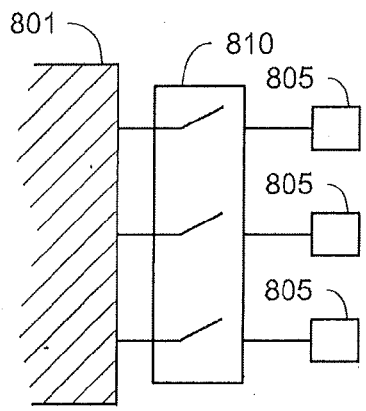

FIGS. 22A-22C show another set of different implementations of a variable impedance element 807 between conductive bodies 801 and 802 that can be used in an active balancing system according to the present disclosure. For example, FIG. 22B shows a variable capacitor (i.e. varicap) 808 and a variable inductor 809. FIG. 22C shows a set of switches 810 that connect and disconnect impedance elements 805 to alter the impedance between two nodes.

Figure 23:
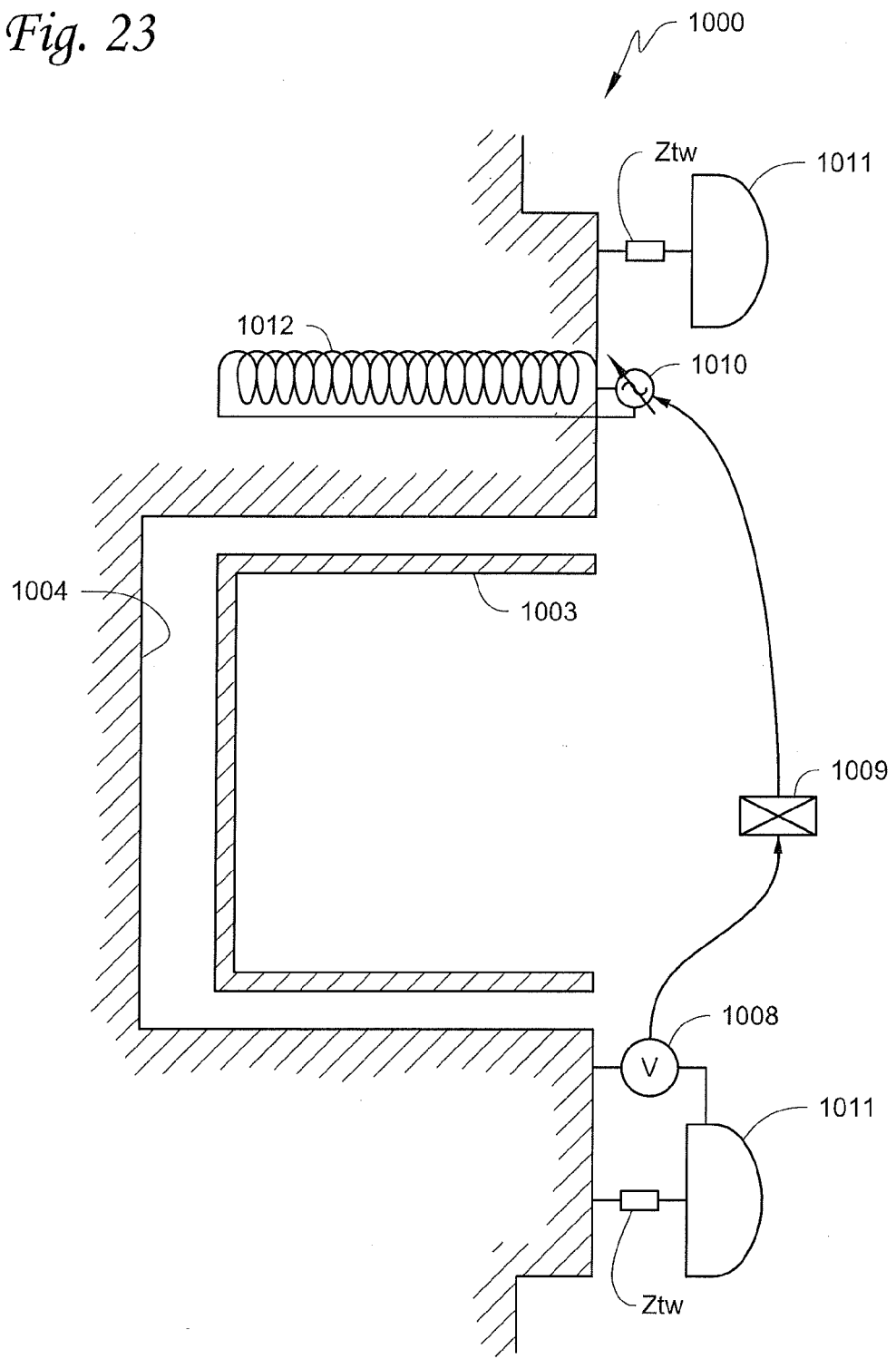
FIG. 23 shows a schematic diagram of an example of a measurement system that includes a coil.

FIG. 23 shows a schematic diagram of an example of a measurement system that includes a coil 1012 located between a wear plate 1011 and a shield electrode 1003. The coil 1012 works with the adjustable current 1010 to act as an adjustable voltage source between the wear plate 1011 and a tool body 1104 in order to provide active balancing within the system 1100.

Figure 24:
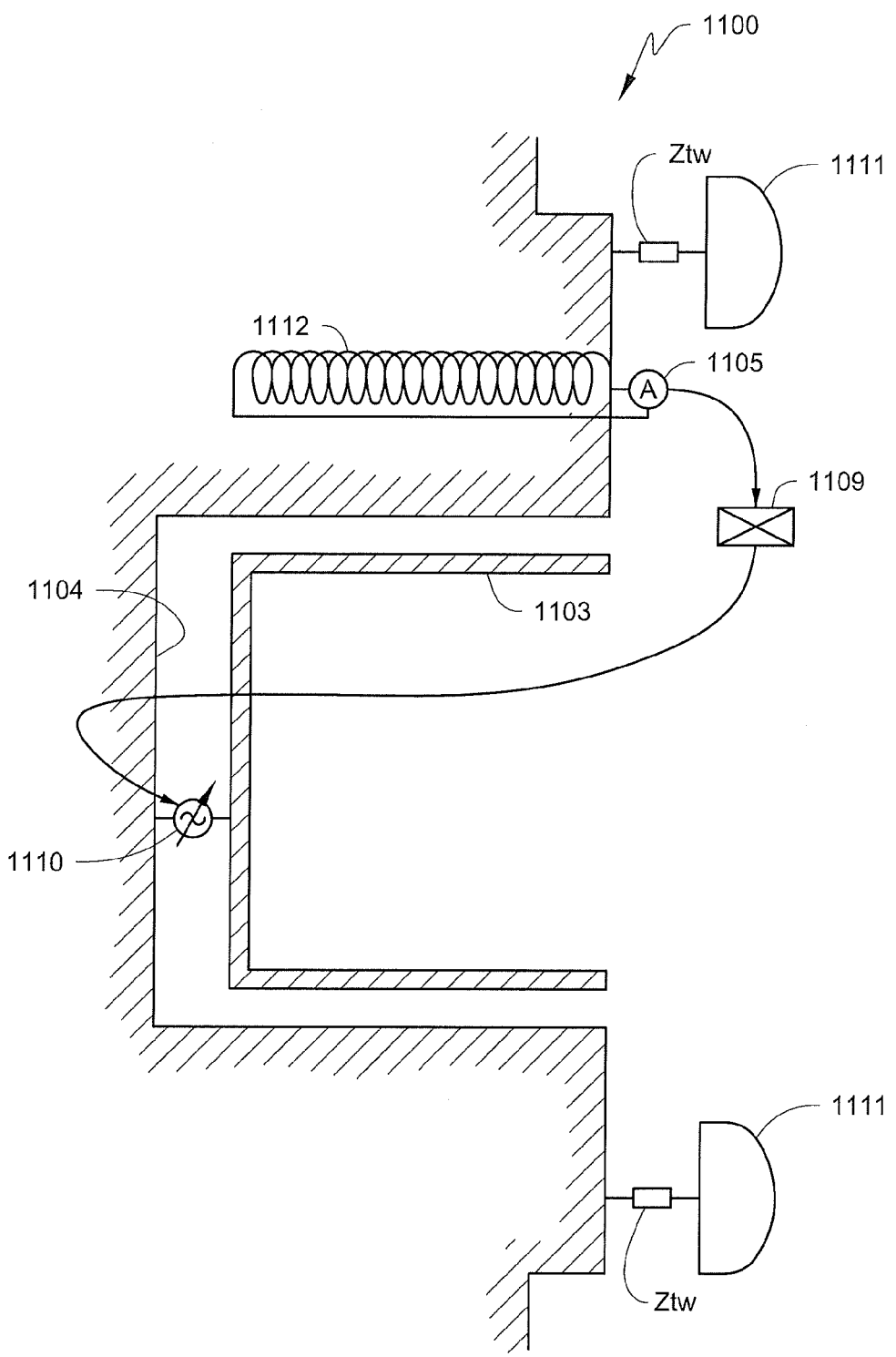
FIG. 24 shows a schematic diagram of another example of a measurement system that includes a coil.

FIG. 24 shows a schematic diagram of another example of a measurement system that includes a coil 1112 located between a wear plate 1111 and a shield electrode 1103. The coil 1112 works with the current measurement device 1105 to act as an electrical measurement device for use in determining an approximate voltage between the tool body 1104 and the wear plate 1111 in order to provide active balancing within the system 1100.

Also, in the embodiments discussed above, a current source can be replaced with a voltage source and at least one impedance element. Similarly, a voltage source can be replaced by a current source and at least one impedance element. A voltage measurement device can be replaced with a current measurement device and at least one impedance element.

Aspects:

1. An apparatus for making a resistivity measurement of an underground formation surrounding a borehole, comprising: a conductive tool body; at least one current injector electrode positioned between the tool body and a wall of the bore hole; at least one current return electrode positioned between the tool body and the wall of the bore hole, the current injector electrode and the current return electrode being electrically isolated from each other; an electrical measurement device configured to monitor a voltage or a current signal indicative of an impedance imbalance; a regulator connected to the electrical measurement device, the regulator configured to receive the voltage or the current signal indicative of the impedance imbalance and configured to generate an adjustment signal based on the voltage or the current signal indicative of the impedance imbalance; an adjustable electrical device connected to the regulator, the adjustable electrical device configured to receive the adjustment signal from the regulator and based on the adjustment signal configured to (a) improve a balancing condition and thereby suppress the impedance imbalance such that the potential difference between the tool body and the formation is about 25% or less than the potential difference between the current injector electrode and the current return electrode, or (b) reduce the effects of non-optimal balancing, such that the potential difference between the tool body and the formation is about 25% or less than the potential difference between the current injector electrode and the current return electrode.

2. The apparatus of aspect 1, wherein the balancing condition is: $Zit/Zrt \approx Zif/Zrf$, where $Zit$ is an electrical impedance between the current injector electrode and the tool body, $Zrt$ is an electrical impedance between the current return electrode and the tool body, $Zif$ is an electrical impedance between the current injector electrode and the foundation, and Zrf is an electrical impedance between the current return electrode and the foundation.

3. The apparatus of aspect 1, wherein to reduce the effects of non-optimal balancing, the adjustment signal generated by the regulator is configured to instruct the adjustable electrical device to adjust the electrical signal within the apparatus to a level such that a voltage between the tool body and a shield electrode is approximately opposite of the voltage between the shield electrode and the formation.

4. The apparatus of aspects 1 through 3, further comprising at least one wear plate positioned between the tool body and the foundation.

5. The apparatus of aspects 1 through 2, at least one shield electrode positioned between the tool body and the wall of the bore hole.

6. The apparatus of aspect 5, wherein the balancing condition is:
Zsi/Zsr≈Zif/Zrf, where Zsi is an electrical impedance between the shield electrode and the current injector electrode, Zsr is an electrical impedance between the shield electrode and the current return electrode, Zif is an electrical impedance between the current injector electrode and the foundation, and Zrf is an electrical impedance between the current return electrode and the foundation 7. The apparatus of aspects 1-6, wherein the potential difference between the tool body and the formation is about 10% or less than the potential difference between the current injector electrode and the current return electrode.

8. The apparatus of aspects 1-7, wherein the potential difference between the tool body and the formation is about 5% or less than the potential difference between the current injector electrode and the current return electrode.

9. The apparatus of aspects 1-8, wherein the potential difference between the tool body and the formation is about 1% or less than the potential difference between the current injector electrode and the current return electrode.

10. The apparatus of aspect 4, wherein the electrical measurement device detects a voltage between the wear plate and the tool body.

11. The apparatus of aspect 3, wherein the adjustable electrical device is an adjustable current source that is configured to adjust a current signal to the shield electrode such that a voltage between the tool body and the shield electrode is opposite a voltage between the shield electrode and the foundation.

12. The apparatus of aspect 1, wherein the electrical measurement device, the regulator and the adjustable electrical device are configured to actively balance the apparatus such that the impedance imbalance does not affect a resistivity measurement of the apparatus while the apparatus is drilling into the underground formation.

13. A method for making resistivity measurements of an underground formation surrounding a borehole using an apparatus, the method comprising the steps of: monitoring a voltage or a current signal indicative of an impedance imbalance using an electrical measurement device of an apparatus; receiving the voltage or the current signal indicative of the impedance imbalance using a regulator of the apparatus; generating an adjustment signal based on the voltage or the current signal indicative of the impedance imbalance using the regulator; receiving the adjustment signal from the regulator using an adjustable electrical device of the apparatus; adjusting an electrical signal or an electrical component within the apparatus to (a) improve a balancing condition and thereby supress the impedance imbalance such that a potential difference between a tool body of the apparatus and a formation is about 25% or less than a potential difference between a current injector electrode and a current return electrode, or (b) reduce the effects of non-optimal balancing, such that the potential difference between the tool body and the formation is about 25% or less than the potential difference between the current injector electrode and the current return electrode; and measuring the resistivity of a foundation.

14. The method of aspect 13, wherein the balancing condition is: Zit/Zrt≈Zif/Zrf, where Zit is an electrical impedance between the current injector electrode and the tool body, Zrt is an electrical impedance between the current return electrode and the tool body, Zif is an electrical impedance between the current injector electrode and the foundation, and Zrf is an electrical impedance between the current return electrode and the foundation.

15. The method of aspect 13, instructing the adjustable electrical device, via the regulator, to adjust the electrical signal within the apparatus to a level such that a voltage between the tool body and a shield electrode is approximately opposite of the voltage between the shield electrode and the formation.

16. The method of aspect 13, wherein the balancing condition is: Zsi/Zsr≈Zif/Zrf, where Zsi is an electrical impedance between the shield electrode and the current injector electrode, Zsr is an electrical impedance between the shield electrode and the current return electrode, Zif is an electrical impedance between the current injector electrode and the foundation, and Zrf is an electrical impedance between the current return electrode and the foundation.

17. The method of aspects 13-16, wherein the potential difference between the tool body and the formation is about 10% or less than the potential difference between the current injector electrode and the current return electrode.

18. The method of aspects 13-17, wherein the potential difference between the tool body and the formation is about 5% or less than the potential difference between the current injector electrode and the current return electrode.

19. The method of aspects 13-18, wherein the potential difference between the tool body and the formation is about 1% or less than the potential difference between the current injector electrode and the current return electrode.

20. The method of aspects 13-19, wherein monitoring the voltage or the current signal indicative of the impedance imbalance using the electrical measurement device of the apparatus comprises detecting a voltage between a wear plate and the tool body of the apparatus.

21. The method of aspects 13, 15 and 17-20, wherein adjusting the electrical signal or the electrical component within the apparatus includes adjusting a current signal to a shield electrode such that a voltage between the tool body and the shield electrode is opposite a voltage between the shield electrode and the foundation.

22. The method of aspects 13-21, further comprising actively balancing the apparatus such that the impedance imbalance does not affect a resistivity measurement of the apparatus while the apparatus is drilling into the underground formation.

23. The apparatus of aspects 1-12, wherein the electrical measurement device is a voltage measurement device.

24. The apparatus of aspects 1-12, wherein the electrical measurement device is a current measurement device.

25. The method of aspects 13-21, wherein the electrical measurement device is a voltage measurement device.

26. The method of aspects 13-21, wherein the electrical measurement device is a current measurement device.

27. The apparatus of aspects 1-12, 23 and 24 wherein the adjustable electrical device is an adjustable voltage source.

24. The apparatus of aspects 1-12, 23 and 24, wherein the adjustable electrical device is an adjustable current source.
25. The method of aspects 13-21, 25 and 26 wherein the adjustable electrical device is an adjustable voltage source.
26. The method of aspects 13-21, 25 and 26 wherein the adjustable electrical device is an adjustable current source.

The invention claimed is:

1. An apparatus for making a resistivity measurement of an underground formation surrounding a borehole, comprising:
   a conductive tool body;
   at least one current injector electrode positioned between the tool body and a wall of the bore hole;
   at least one current return electrode positioned between the tool body and the wall of the bore hole, the current injector electrode and the current return electrode being electrically isolated from each other;
   an electrical measurement device configured to monitor a voltage or a current signal indicative of an impedance imbalance;
   a regulator connected to the electrical measurement device, the regulator configured to receive the voltage or the current signal indicative of the impedance imbalance and configured to generate an adjustment signal based on the voltage or the current signal indicative of the impedance imbalance;
   an adjustable electrical device connected to the regulator, the adjustable electrical device configured to receive the adjustment signal from the regulator and based on the adjustment signal configured to (a) improve a balancing condition and thereby supress the impedance imbalance such that the potential difference between the tool body and the formation is about 25% or less than the potential difference between the current injector electrode and the current return electrode, or (b) reduce the effects of non-optimal balancing, such that the potential difference between the tool body and the formation is about 25% or less than the potential difference between the current injector electrode and the current return electrode.

2. The apparatus of claim 1, wherein the balancing condition is:

$$Zit/Zrt \approx Zif/Zrf,$$

where Zit is an electrical impedance between the current injector electrode and the tool body, Zrt is an electrical impedance between the current return electrode and the tool body, Zif is an electrical impedance between the current injector electrode and the foundation, and Zrf is an electrical impedance between the current return electrode and the foundation.

3. The apparatus of claim 1, wherein to reduce the effects of non-optimal balancing, the adjustment signal generated by the regulator is configured to instruct the adjustable electrical device to adjust the electrical signal within the apparatus to a level such that a voltage between the tool body and a shield electrode is approximately opposite of the voltage between the shield electrode and the formation.

4. The apparatus of claim 3, wherein the adjustable electrical device is an adjustable current source that is configured to adjust a current signal to the shield electrode such that a voltage between the tool body and the shield electrode is opposite a voltage between the shield electrode and the foundation.

5. The apparatus of claim 1, comprising at least one wear plate positioned between the tool body and the foundation.

6. The apparatus of claim 5, wherein the electrical measurement device detects a voltage between the wear plate and the tool body.

7. The apparatus of claim 1, comprising at least one shield electrode positioned between the tool body and the wall of the bore hole.

8. The apparatus of claim 7, wherein the balancing condition is:

$$Zsi/Zsr \approx Zif/Zrf,$$

where Zsi is an electrical impedance between the shield electrode and the current injector electrode, Zsr is an electrical impedance between the shield electrode and the current return electrode, Zif is an electrical impedance between the current injector electrode and the foundation, and Zrf is an electrical impedance between the current return electrode and the foundation.

9. The apparatus of claim 1, wherein the electrical measurement device, the regulator and the adjustable electrical device are configured to actively balance the apparatus such that the impedance imbalance does not affect a resistivity measurement of the apparatus while the apparatus is drilling into the underground formation.

10. A method for making resistivity measurements of an underground formation surrounding a borehole using an apparatus, the method comprising the steps of:
    monitoring a voltage or a current signal indicative of an impedance imbalance using an electrical measurement device of an apparatus;
    receiving the voltage or the current signal indicative of the impedance imbalance using a regulator of the apparatus;
    generating an adjustment signal based on the voltage or the current signal indicative of the impedance imbalance using the regulator;
    receiving the adjustment signal from the regulator using an adjustable electrical device of the apparatus;
    adjusting an electrical signal or an electrical component within the apparatus to (a) improve a balancing condition and thereby supress the impedance imbalance such that a potential difference between a tool body of the apparatus and a formation is about 25% or less than a potential difference between a current injector electrode and a current return electrode, or (b) reduce the effects of non-optimal balancing, such that the potential difference between the tool body and the formation is about 25% or less than the potential difference between the current injector electrode and the current return electrode; and
    measuring the resistivity of a foundation.

11. The method of claim 10, wherein the balancing condition is:

$$Zit/Zrt \approx Zif/Zrf,$$

where Zit is an electrical impedance between the current injector electrode and the tool body, Zrt is an electrical impedance between the current return electrode and the tool body, Zif is an electrical impedance between the current injector electrode and the foundation, and Zrf is an electrical impedance between the current return electrode and the foundation.

12. The method of claim 10, wherein adjusting an electrical signal or an electrical component within the apparatus to reduce the effects of non-optimal balancing includes instructing the adjustable electrical device, via the regulator, to adjust the electrical signal within the apparatus to a level such that a voltage between the tool body and a shield electrode is approximately opposite of the voltage between the shield electrode and the formation.

13. The method of claim 10, wherein the balancing condition is:

$$Z_{si}/Z_{sr} \approx Z_{if}/Z_{rf},$$

where Zsi is an electrical impedance between the shield electrode and the current injector electrode, Zsr is an electrical impedance between the shield electrode and the current return electrode, Zif is an electrical impedance between the current injector electrode and the foundation, and Zrf is an electrical impedance between the current return electrode and the foundation.

14. The method of claim 10, wherein monitoring the voltage or the current signal indicative of the impedance imbalance using the electrical measurement device of the apparatus comprises detecting a voltage between a wear plate and the tool body of the apparatus.

15. The method of claim 10, wherein adjusting an electrical signal or an electrical component within the apparatus to reduce the effects of non-optimal balancing includes adjusting the electrical signal or the electrical component within the apparatus includes adjusting a current signal to a shield electrode such that a voltage between the tool body and a shield electrode is opposite a voltage between the shield electrode and the foundation.

16. The method of claim 10, comprising actively balancing the apparatus such that the impedance imbalance does not affect a resistivity measurement of the apparatus while the apparatus is drilling into the underground formation.

* * * * *